US012553534B2

United States Patent
Sano et al.

(10) Patent No.: US 12,553,534 B2
(45) Date of Patent: Feb. 17, 2026

(54) PROPORTIONAL SOLENOID VALVE CONTROL METHOD, PROPORTIONAL SOLENOID VALVE SYSTEM, PROPORTIONAL SOLENOID VALVE CONTROL DEVICE, VALVE OPENING DEGREE CONTROL PROGRAM, PROPORTIONAL SOLENOID VALVE, HEAT SOURCE DEVICE, HEAT SOURCE DEVICE CONTROL METHOD, HEAT SOURCE DEVICE CONTROL PROGRAM, RECORDING MEDIUM, CONTROL DEVICE, AND HOT WATER SUPPLY DEVICE

(71) Applicant: PURPOSE CO., LTD., Fuji (JP)

(72) Inventors: Yoshiaki Sano, Fuji (JP); Hiroyuki Yamada, Fuji (JP); Shinsuke Mochizuki, Fuji (JP)

(73) Assignee: PURPOSE CO., LTD., Fuji (JP)

( * ) Notice: Subject to any disclaimer, the term of this patent is extended or adjusted under 35 U.S.C. 154(b) by 570 days.

(21) Appl. No.: 17/796,172

(22) PCT Filed: Jan. 22, 2021

(86) PCT No.: PCT/JP2021/002222
§ 371 (c)(1),
(2) Date: Jul. 28, 2022

(87) PCT Pub. No.: WO2021/153449
PCT Pub. Date: Aug. 5, 2021

(65) Prior Publication Data
US 2023/0069994 A1  Mar. 9, 2023

(30) Foreign Application Priority Data

Jan. 29, 2020 (JP) .................................. 2020-012341
Feb. 25, 2020 (JP) .................................. 2020-028965

(51) Int. Cl.
*F16K 31/06* (2006.01)
*F23K 5/00* (2006.01)
(Continued)

(52) U.S. Cl.
CPC ................ *F16K 31/06* (2013.01); *F23K 5/00* (2013.01); *F24H 1/10* (2013.01); *H01F 7/16* (2013.01); *H01F 7/18* (2013.01)

(58) Field of Classification Search
CPC ... F16K 31/06; F23K 5/00; F24H 1/10; H01F 7/16; H01F 7/18
(Continued)

(56) References Cited

U.S. PATENT DOCUMENTS 4,774,485 A * 9/1988 Dietrich ............. H01H 51/2209
335/78
4,779,582 A * 10/1988 Lequesne .............. H01F 7/1646
123/90.11
(Continued)

FOREIGN PATENT DOCUMENTS

CN   102782289 A   11/2012
CN   105782546 A    7/2016
(Continued)

OTHER PUBLICATIONS

Notification Concerning Transmittal of Copies of International Preliminary Report on Patentability (Form PCT/IB/326) issued in counterpart International Application No. PCT/JP2021/002222 mailed Aug. 11, 2022 with Forms PCT/IB/373, PCT/IB/338 and PCT/ISA/237. (12 pages).
(Continued)

*Primary Examiner* — William M McCalister
(74) *Attorney, Agent, or Firm* — WHDA, LLP

(57) ABSTRACT

A method of controlling a proportional solenoid valve whose valve opening degree is controlled by excitation of a pro-
(Continued)

portional solenoid includes: generating a driving current (id) that excites a proportional solenoid (28); reversing a polarity of the driving current (id) at a cycle faster than movement of a valve body (18); and controlling the valve opening degree by a current level of the driving current (id). As a result, an alternating magnetic field is generated in the proportional solenoid so that a desired valve opening degree is obtained by the driving current level while obviating the influence of the residual magnetism.

23 Claims, 18 Drawing Sheets

(51) Int. Cl.
    *F24H 1/10*     (2022.01)
    *H01F 7/16*     (2006.01)
    *H01F 7/18*     (2006.01)

(58) Field of Classification Search
    USPC ........................................ 251/129.15
    See application file for complete search history.

(56) References Cited

U.S. PATENT DOCUMENTS

| | | | | |
|---|---|---|---|---|
| 5,127,585 | A * | 7/1992 | Mesenich | H01F 7/1615 239/585.5 |
| 5,381,297 | A * | 1/1995 | Weber | F02D 41/20 361/153 |
| 5,521,446 | A * | 5/1996 | Chalupa | H01F 7/1615 318/135 |
| 6,067,490 | A | 5/2000 | Ichimaru et al. | |
| 6,845,001 | B1 * | 1/2005 | Kinbara | H01F 7/1844 361/160 |
| 9,689,361 | B2 * | 6/2017 | Dames | F02M 51/0621 |
| 10,655,583 | B2 * | 5/2020 | Omekanda | F02D 41/402 |
| 10,823,101 | B1 * | 11/2020 | Gwidt | G05F 5/00 |
| 11,220,969 | B1 * | 1/2022 | Pursifull | F02D 41/20 |
| 2003/0062030 | A1 * | 4/2003 | Oashi | F02M 63/0017 123/456 |
| 2003/0169552 | A1 * | 9/2003 | Seale | F01L 9/20 361/160 |
| 2003/0184946 | A1 * | 10/2003 | Kolmanovsky | F01L 9/20 361/160 |
| 2004/0134468 | A1 * | 7/2004 | Yamazaki | F02D 41/20 123/499 |
| 2006/0225985 | A1 * | 10/2006 | Dimig | H01F 13/006 192/84.1 |
| 2007/0285195 | A1 * | 12/2007 | Nehl | G01R 33/14 335/209 |
| 2012/0261499 | A1 * | 10/2012 | Dames | F16K 31/0675 335/229 |
| 2013/0014715 | A1 | 1/2013 | Imai et al. | |
| 2017/0175917 | A1 | 6/2017 | Kolbenschlag | |
| 2017/0179865 | A1 | 6/2017 | Omekanda et al. | |
| 2017/0330666 | A1 * | 11/2017 | Dames | F02M 51/0621 |
| 2019/0316774 | A1 * | 10/2019 | Abate | H01F 7/064 |
| 2020/0032751 | A1 | 1/2020 | Chia et al. | |

FOREIGN PATENT DOCUMENTS

| | | | |
|---|---|---|---|
| CN | 110603377 | A | 12/2019 |
| JP | H2-229982 | A | 9/1990 |
| JP | H10-258625 | A | 9/1998 |
| JP | 2006-77601 | A | 3/2006 |
| JP | 4169780 | B1 | 10/2008 |
| WO | WO-2015143109 | A1 * | 9/2015 ............. F02D 41/20 |

OTHER PUBLICATIONS

International Search Report dated Apr. 13, 2021, issued in counterpart International application No. PCT/JP2021/002222, with English translation. (6 pages).
Written Opinion dated Apr. 13, 2021, issued in counterpart International application No. PCT/JP2021/002222, with English translation. (8 pages).
Office Action dated Sep. 5, 2023, issued in counterpart JP application No. 2020-012341, with English translation. (6 pages).
Office Action dated Nov. 26, 2024, issued in counterpart JP Application No. 2024-039557, with English translation. (8 pages).
Office Action dated Dec. 3, 2024, issued in counterpart JP Application No. 2024-039558, with English translation. (8 pages).
Office Action dated Mar. 6, 2025, issued in counterpart CN Application No. 202180011410.4, with English translation. (45 pages).
Office Action dated Sep. 22, 2025, issued in counterpart CN Application No. 202180011410.4, with English translation. (42 pages).

\* cited by examiner

PROPORTIONAL SOLENOID VALVE CONTROL METHOD, PROPORTIONAL SOLENOID VALVE SYSTEM, PROPORTIONAL SOLENOID VALVE CONTROL DEVICE, VALVE OPENING DEGREE CONTROL PROGRAM, PROPORTIONAL SOLENOID VALVE, HEAT SOURCE DEVICE, HEAT SOURCE DEVICE CONTROL METHOD, HEAT SOURCE DEVICE CONTROL PROGRAM, RECORDING MEDIUM, CONTROL DEVICE, AND HOT WATER SUPPLY DEVICE

TECHNICAL FIELD

The present disclosure relates to a proportional solenoid valve for use as e.g. a fuel gas control valve, control techniques thereof, or a heat source device using the proportional solenoid valve for a fuel gas control, a control method, a program, a control device and a control technique of a hot water supply device.

BACKGROUND ART

A valve is used for control of a fluid such as fuel gas. Known as the valve therefore is a proportional solenoid valve that controls a valve opening degree by excitation of a solenoid. For example, control by pulse width modulation (PWM) scheme is used in the opening degree control of the proportional solenoid valve. Regarding the PWM control of the proportional solenoid valve, in a suspension control device, control is known that adjusts the cycle of dither vibration irrespective of the magnitude of flowing current (Patent Literature 1).

CITATION LIST

Patent Literature

Patent Literature 1: JP H10-258625 A

SUMMARY OF INVENTION

Technical Problem

In the proportional solenoid valve there is a difference between a driving current when a specific valve opening degree is reached by increasing the driving current fed to the solenoid and a driving current when the specific valve opening degree is reached by decreasing the driving current. A difference occurs between a valve opening degree when a specific driving current is reached by increasing the driving current and a valve opening degree when the specific driving current is reached by decreasing the driving current. That is, hysteresis lies in the driving current and the valve opening degree so that the valve opening degree differs depending on the increase/decrease direction of current even when the driving current is the same and so that the driving current differs even when the valve opening degree is the same.

In the case of using the proportional solenoid valve having such hysteresis characteristics, control of a fluid such as fuel gas is affected and the reliability of the control characteristics is impaired. A factor of such hysteresis lies in magnetization characteristics of the proportional solenoid valve, esp. residual magnetism. In the case of using magnetic, the influence of this residual magnetism cannot be ignored.

Considering the residual magnetism and excitation of the solenoid, there is a problem that the generated magnetic force is partly offset by the residual magnetism at the timing when the proportional solenoid is excited in the direction opposite to that of the residual magnetism although the residual magnetism is added to the generated magnetic force at the timing when the proportional solenoid is excited in the same direction as that of the residual magnetism.

For such a problem, the inventors gained findings that the proportional solenoid is made to generate an alternating magnetic field to alleviate the influence of the residual magnetism and that a desired valve opening degree is obtained by the current level even with the driving current generating such an alternating magnetic field.

Patent Literature 1 neither discloses nor suggests such a problem, which cannot be solved by the configuration disclosed in Patent Literature 1.

Thus, in view of the above problem and findings, it is an object of the present disclosure to obtain a desired valve opening degree by the driving current level while obviating the influence of the residual magnetism by making the proportional solenoid generate an alternating magnetic field.

Solution to Problem

In order to achieve the above object, one aspect of a proportional solenoid valve control method of the present disclosure is a proportional solenoid valve control method, valve opening degree being controlled by excitation of a proportional solenoid, the proportional solenoid valve control method including: generating a driving current that excites the proportional solenoid; reversing a polarity of the driving current at a cycle faster than movement of a valve body; and controlling the valve opening degree by a current level of the driving current.

The proportional solenoid valve control method may include: generating a forward pulse containing a polarity reversal portion that reverses a reverse polarity of the driving current to a forward polarity; generating a reverse pulse containing a polarity reversal portion that reverses the forward polarity of the driving current to the reverse polarity; controlling a duty ratio of the forward pulse except for the polarity reversal portion; and controlling a duty ratio of the reverse pulse except for the polarity reversal portion.

To achieve the above object, one aspect of a proportional solenoid valve system of the present disclosure is a proportional solenoid valve system including: a proportional solenoid valve whose valve opening degree is configured to be controlled by excitation of a proportional solenoid; a driving part configured to generate a driving current that excites the proportional solenoid, the driving part being configured to feed the driving current to the proportional solenoid; and a control part configured to reverse a polarity of the driving current at a cycle faster than movement of a valve body, the control part being configured to control the valve opening degree by a current level of the driving current.

The proportional solenoid valve system may further include: a logic circuit configured to generate a forward pulse containing a polarity reversal portion that reverses a reverse polarity of the driving current to a forward polarity, the logic circuit being configured to generate a reverse pulse containing a polarity reversal portion that reverses the forward polarity of the driving current to the reverse polarity; and a pulse width control part configured to control a duty ratio of the forward pulse except for the polarity reversal portion or a duty ratio of the reverse pulse except for the polarity reversal portion.

To achieve the above object, one aspect of a proportional solenoid valve control device of the present disclosure includes: a driving part configured to generate a driving current that excites a proportional solenoid configured to control a valve opening degree by excitation, the driving part being configured to feed the driving current to the proportional solenoid; and a control part configured to reverse a polarity of the driving current at a cycle faster than movement of a valve body, the control part being configured to control the valve opening degree by a current level of the driving current.

In the proportional solenoid valve control device, the control part may include: a logic circuit configured to generate a forward pulse containing a polarity reversal portion that reverses a reverse polarity of the driving current to a forward polarity, the logic circuit being configured to generate a reverse pulse containing a polarity reversal portion that reverses the forward polarity of the driving current to the reverse polarity; and a pulse width control part configured to control a duty ratio of the forward pulse except for the polarity reversal portion or a duty ratio of the reverse pulse except for the polarity reversal portion.

To achieve the above object, one aspect of a valve opening degree control program of the present disclosure is a valve opening degree control program for causing a computer to implement the functions of: generating control information for generating a driving current that excites a proportional solenoid; generating control information reversing a polarity of the driving current at a cycle faster than movement of a valve body; and generating control information controlling a valve opening degree by a current level of the driving current.

The valve opening degree control program may further cause the computer to implement the functions of: generating a forward pulse containing a polarity reversal portion that reverses a reverse polarity of the driving current to a forward polarity; generating a reverse pulse containing a polarity reversal portion that reverses the forward polarity of the driving current to the reverse polarity; controlling a duty ratio of the forward pulse except for the polarity reversal portion; and controlling a duty ratio of the reverse pulse except for the polarity reversal portion.

To achieve the above object, one aspect of a proportional solenoid valve of the present disclosure includes: a valve mechanism configured to be controlled by excitation of a proportional solenoid; a driving part configured to feed a driving current to the proportional solenoid; and a control part configured to reverse a polarity of the driving current at a cycle faster than movement of a valve body to cancel a residual magnetism, the control part being configured to adjust a valve opening degree by a current level of the driving current.

To achieve the above object, one aspect of a proportional solenoid valve of the present disclosure includes: a valve mechanism; a proportional solenoid configured to control the valve mechanism by excitation; a driving part configured to generate a driving current that excites the proportional solenoid, the driving part being configured to feed the driving current to the proportional solenoid; and a control part configured to reverse a polarity of the driving current at a cycle faster than movement of a valve body, the control part being configured to control a valve opening degree by a current level of the driving current.

In the proportional solenoid valve, the control part may include: a logic circuit configured to generate a forward pulse containing a polarity reversal portion that reverses a reverse polarity of the driving current to a forward polarity, the logic circuit being configured to generate a reverse pulse containing a polarity reversal portion that reverses the forward polarity of the driving current to the reverse polarity; and a pulse width control part configured to control a duty ratio of the forward pulse except for the polarity reversal portion or a duty ratio of the reverse pulse except for the polarity reversal portion.

To achieve the above object, one aspect of a heat source device of the present disclosure includes: a burner configured to burn fuel gas; a proportional solenoid valve whose valve opening degree is configured to be controlled by excitation of a proportional solenoid, the proportional solenoid valve being configured to allow the fuel gas that is to be supplied to the burner to pass through; a driving part configured to generate a driving current that excites the proportional solenoid, the driving part being configured to feed the driving current to the proportional solenoid; and a control part configured to reverse a polarity of the driving current at a cycle faster than movement of a valve body, the control part being configured to control a valve opening degree by a current level of the driving current.

The heat source device further includes: a heat exchanger configured to transfer combustion heat of the fuel gas to a fluid to be heated; and a temperature sensor configured to detect a temperature of the heated fluid, wherein the control part is configured to receive the detected temperature of the heated fluid to control the valve opening degree.

In the heat source device, the control part may include: a logic circuit configured to generate a forward pulse containing a polarity reversal portion that reverses a reverse polarity of the driving current to a forward polarity, the logic circuit being configured to generate a reverse pulse containing a polarity reversal portion that reverses the forward polarity of the driving current to the reverse polarity; and a pulse width control part configured to control a duty ratio of the forward pulse except for the polarity reversal portion or a duty ratio of the reverse pulse except for the polarity reversal portion.

To achieve the above object, one aspect of a heat source device control method of the present disclosure is a heat source device control method using a proportional solenoid valve to control fuel gas, the heat source device control method including: generating a driving current that drives the proportional solenoid valve; burning the fuel gas having passed through the proportional solenoid valve; reversing a polarity of the driving current at a cycle faster than movement of a valve body; and controlling a valve opening degree by a current level of the driving current.

The heat source device control method may further include: transferrin combustion heat of the fuel gas to a fluid to be heated; and detecting a temperature of the heated fluid and controlling the valve opening degree by the detected temperature of the heated fluid.

The heat source device control method may further include: generating a forward pulse containing a polarity reversal portion that reverses a reverse polarity of the driving current to a forward polarity; generating a reverse pulse containing a polarity reversal portion that reverses the forward polarity of the driving current to the reverse polarity; controlling a duty ratio of the forward pulse except for the polarity reversal portion; and controlling a duty ratio of the reverse pulse except for the polarity reversal portion.

To achieve the above object, one aspect of a heat source device control program of the present disclosure is a heat source device control program for causing a computer to implement the functions of: generating control information for generating a driving current that excites a proportional solenoid; generating control information reversing a polarity of the driving current at a cycle faster than movement of a valve body; and generating control information controlling a valve opening degree by a current level of the driving current.

The heat source device control program may further cause the computer to implement the functions of: generating a forward pulse containing a polarity reversal portion that reverses a reverse polarity of the driving current to a forward polarity; generating a reverse pulse containing a polarity reversal portion that reverses the forward polarity of the driving current to the reverse polarity; controlling a duty ratio of the forward pulse except for the polarity reversal portion; and controlling a duty ratio of the reverse pulse except for the polarity reversal portion.

To achieve the above object, according to one aspect of a recording medium of the present disclosure, it stores therein the program.

To achieve the above object, one aspect of a control device of the present disclosure is a control device configured to control a fuel gas volume, the control device including: a driving part configured to generate a driving current that excites a proportional solenoid configured to control a valve opening degree by excitation, the driving part being configured to feed the driving current to the proportional solenoid; and a control part configured to reverse a polarity of the driving current at a cycle faster than movement of a valve body, the control part being configured to control the valve opening degree by a current level of the driving current.

In the control device, the control part may include: a logic circuit configured to generate a forward pulse containing a polarity reversal portion that reverses a reverse polarity of the driving current to a forward polarity, the logic circuit being configured to generate a reverse pulse containing a polarity reversal portion that reverses the forward polarity of the driving current to the reverse polarity; and a pulse width control part configured to control a duty ratio of the forward pulse except for the polarity reversal portion or a duty ratio of the reverse pulse except for the polarity reversal portion.

To achieve the above object, one aspect of a hot water supply device of the present disclosure includes any one of the heat source device, the heat source device control method, the heat source device control program, the recording medium, and the control device, and is configured to heat supply water to supply hot water at a hot water supply temperature raised to a set temperature.

Advantageous Effects of Invention

According to the present disclosure, any of the following effects can be obtained.

(1) Hysteresis arising from the residual magnetism can be reduced since the residual magnetism can be offset by an alternating magnetic field generated by the solenoid with reversing the polarity of the driving current fed to the solenoid.

(2) The valve opening degree can be controlled by the driving current level without being affected by the residual magnetism.

(3) The difference can be reduced between a driving current when controlled to a specific opening degree by increasing the driving current fed to the solenoid and a driving current when controlled to the specific opening degree by decreasing the driving current.

(4) The difference can be reduced between a valve opening degree when the driving current is reached to a specific driving current by increasing the driving current fed to the solenoid and a valve opening degree when the driving current is control led to the specific driving current by decreasing the driving current.

(5) Since the influence of the residual magnetism in the proportional solenoid valve can be alleviated or obviated, the difference in the valve opening degree for the driving current can be reduced between the increasing direction and the decreasing direction of the current level. This can prevent the difference occurring in the fuel gas supply volume for the driving current in the case of using the proportional solenoid valve for the fuel gas supply control.

Other objects, features, and advantages of the present invention will become more apparent by referring to the accompanying drawings and embodiments.

DESCRIPTION OF EMBODIMENTS

First Embodiment

Figure 1:
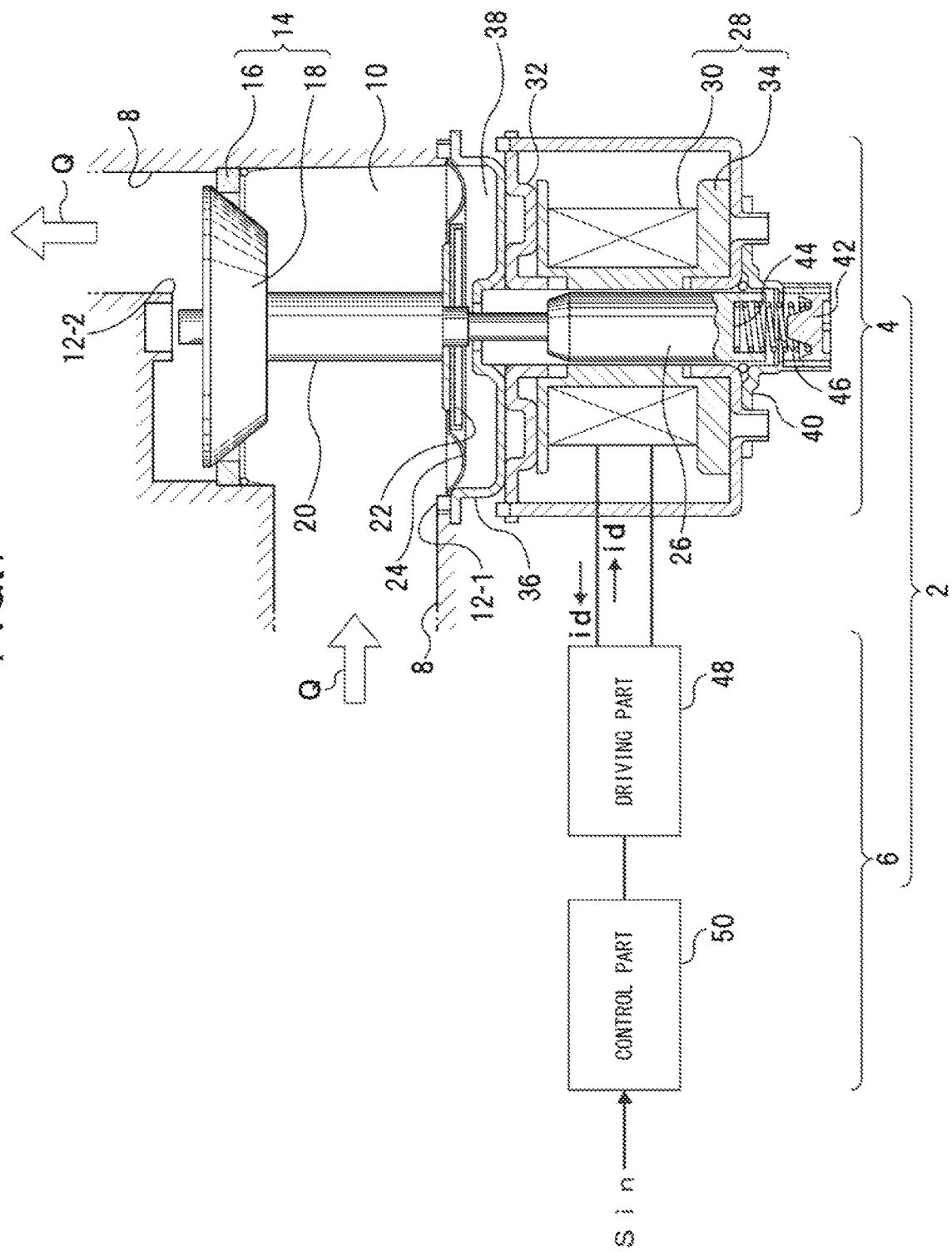
FIG. 1 is a view showing a proportional solenoid valve system according to a first embodiment.

FIG. 1 shows a proportional solenoid valve system 2 according to a first embodiment. The configuration shown in FIG. 1 is an example, and the present disclosure is not limited to such a configuration.

The proportional solenoid valve system 2 includes a proportional solenoid valve 4 and a control device 6. The proportional solenoid valve 4 is disposed on a fluid path 8 through which a fluid Q such as fuel gas flows. A valve chamber 10 includes an inlet port 12-1 and an outlet port 12-2. The fluid Q flowing through the fluid path 8 is introduced from the inlet port 12-1 into the valve chamber 10 and flows from the valve chamber 10 via a valve mechanism 14 and through the outlet port 12-2 into the fluid path 8. A flow direction of the fluid Q indicated by an arrow is merely an example.

The valve mechanism 14 includes a valve seat 16 and a valve body 18. The valve seat 16 is fixed to a wall surface of the valve chamber 10. The valve body 18 moves in a direction orthogonal to a valve seat surface of the valve seat 16.

Part of a diaphragm 24 is attached by a support member 22 to a stem 20 formed on a central axis of the valve body 18. An outer edge of the diaphragm 24 is supported on an inner wall of the valve chamber 10. Therefore, the valve body 18 is supported by the diaphragm 24 so as to be vertically movable in the valve chamber 10. When a pressure of the fluid Q acts on the interior of the valve chamber 10, the diaphragm 24 is lowered by swelling.

In the proportional solenoid valve 4, a movable magnetic pole 26 is disposed under the valve body 18, the movable magnetic pole 26 being in contact with the stem 20 of the valve body 18. That is, the movable magnetic pole 26 acts as a plunger. The movable magnetic pole 26 is inserted into a proportional solenoid 28 and is movable in a direction of the central axis of the valve body 18. A yoke 32 is disposed on the proportional solenoid 28 with a coil 30 in between. The coil 30 is wound on a coil bobbin 34 to make up the proportional solenoid 28. Accordingly, the yoke 32 serves as a fixed magnetic pole with respect to the movable magnetic pole 26.

A support frame 36 is fixed to the yoke 32. The support frame 36 includes a space portion 38 that permits swelling of the diaphragm 24. A support member 40 is fixed to the yoke 32. The support member 40 includes a spring support portion 42. The movable magnetic pole 26 includes a spring insertion portion 44, with a coiled spring 46 being disposed between the spring insertion portion 44 and the spring support portion 42. Hence, a restoring force of the spring 46 acts on the movable magnetic pole 26.

The control device 6 includes e.g. a driving part 48 and a control part 50 and performs generation, a polarity reversal, and a level control of a driving current id. The driving part 48 generates the driving current id under the control of the control part 50 and feeds the driving current id to the proportional solenoid 28. The control part 50 is configured from e.g. a computer and receives, as control signals Sin, e.g. detection outputs from various sensors such as a temperature sensor and a water volume sensor, to perform information processing for controlling the proportional solenoid valve 4. The information processing includes:
 (a) control for generation of the driving current id;
 (b) polarity reversal of the driving current id based on faster cycle than movement of the valve body 18; and
 (c) control of a valve opening degree based on a current level of the driving current id.

<Valve Mechanism 14>

Figure 2:
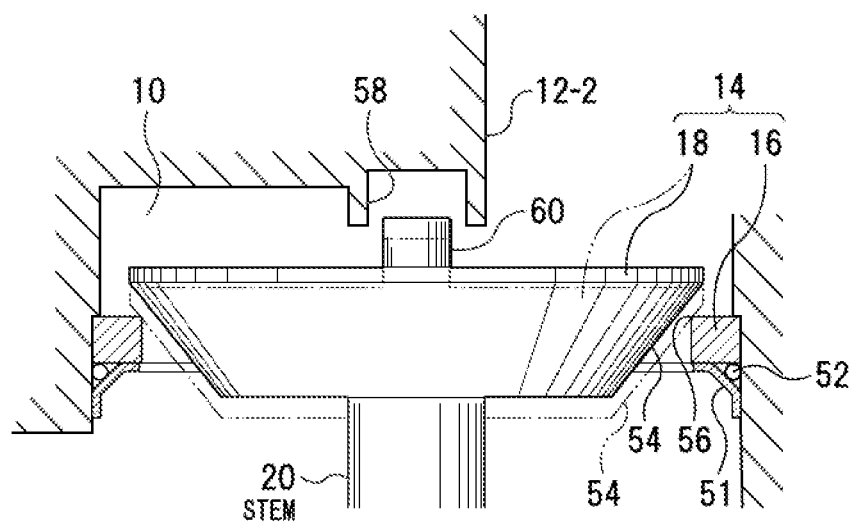
FIG. 2 is a view showing a valve mechanism of a proportional solenoid valve.

FIG. 2 shows the valve mechanism 14 of the proportional solenoid valve 4 in an enlarged manner. The valve seat 16 is fixed by a holding frame 51 in the valve chamber 10. An O-ring 52 seals a space defined between the valve seat 16 and the inner wall surface of the valve chamber 10.

The valve body 18 has a conical surface 54, the conical surface 54 and a valve opening 56 of the valve seat 16 providing a valve function.

The valve chamber 10 has, e.g. on the central axis of the valve body 18, a circular recess 58 formed facing one surface of the valve body 18. The valve body 18 has, on its enlarged-diameter surface, a protrusion 60 formed facing the recess 58. The valve chamber 10 permits the movement of the valve body 18 with an entry of the protrusion 60 into the recess 58 when the valve body 18 moves.

<Valve Driving Mechanism 62 and Generation of Attraction Force F>

Figure 3:
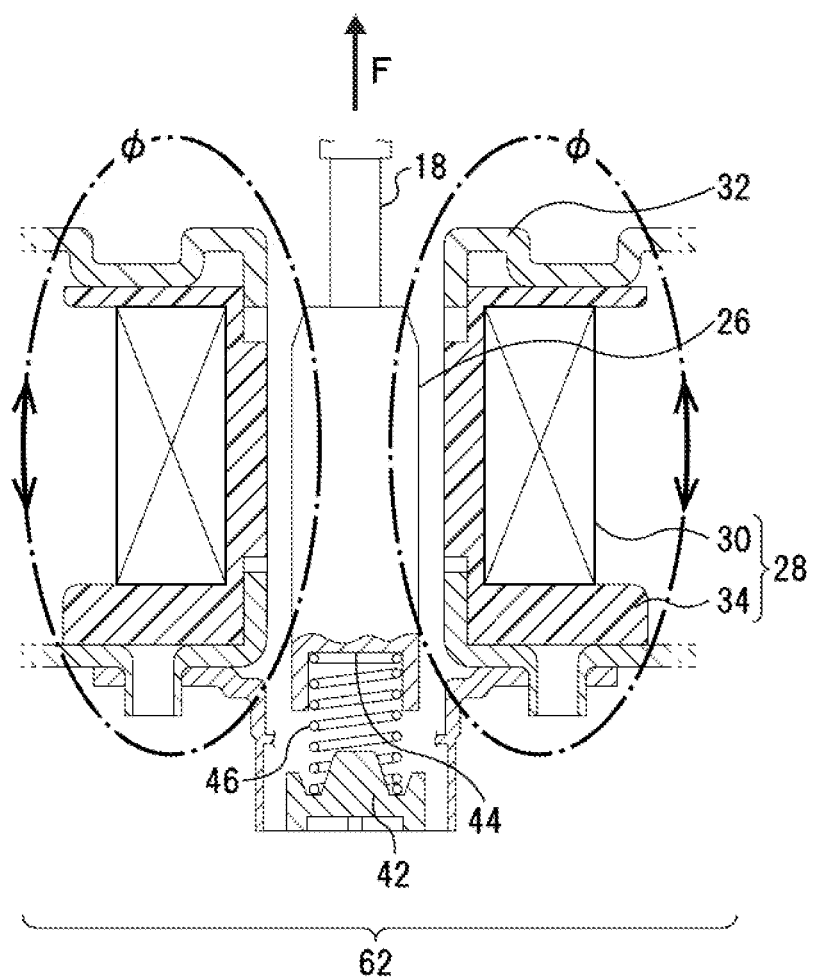
FIG. 3 is a view showing a valve driving mechanism of the proportional solenoid valve.

FIG. 3 shows a valve driving mechanism 62 of the proportional solenoid valve 4. The valve driving mechanism 62 vertically drives the valve body 18 by excitation of the driving current id.

When the driving current id flows through the proportional solenoid 28, the proportional solenoid 28 generates a magnetic field $\phi$. This magnetizes the movable magnetic pole 26 and the yoke 32 (fixed magnetic pole) so that mutually different magnetic poles N and S are generated in the movable magnetic pole 26 and the yoke 32. When receiving attraction force F caused by the magnetic poles N and S, the movable magnetic pole 26 moves in the direction of the attraction force F. Since the mutually different magnetic poles N and S are generated in the movable magnetic pole 26 and the yoke 32 irrespective of the direction of the driving current id, the attraction force F by the magnetic poles N and S works.

<Polarity Reversal of Driving Current Id>

In the valve driving mechanism 62, when the polarity of the driving current id is reversed at a certain cycle, the polarities of the magnetic poles N and S reverse in the movable magnetic pole 26 and the yoke 32, while an attraction force F in the same direction works between the both. As a result, the valve driving mechanism 62 can obtain the valve opening degree in accordance with a current level of the driving current id irrespective of the polarity. In this manner, in the valve driving mechanism 62, the directions of magnetization of the movable magnetic pole 26 and the yoke 32 are reversed by the reversal of the driving current id, and hence a residual magnetism is offset by a reverse current so that influence of the residual magnetism can be eliminated.

<Control Process of Proportional Solenoid Valve 4>

Figure 4:
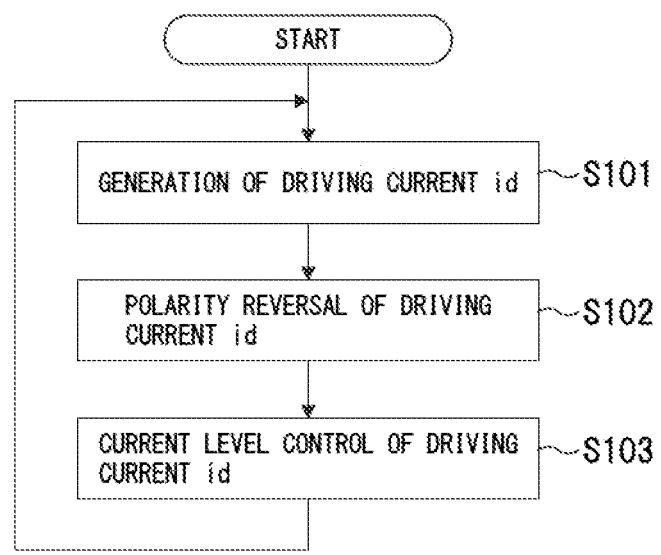
FIG. 4 is a flowchart showing a control process of the proportional solenoid valve.

FIG. 4 shows an example of a control process of the proportional solenoid valve 4. The control process includes generation of driving current id (S101), polarity reversal of driving current id (S102), and current level control of driving current id (S103).

Generation of driving current id (S101): The control device 6 generates the driving current id fed to the proportional solenoid 28.

Polarity reversal of driving current id (S102): The control device 6 reverses the polarity of the driving current id at a faster cycle than the moving velocity of the valve body 18. The movement of the valve body 18 depends on the fluctuation of the current level of the driving current id, and the polarity reversal of the driving current id is performed at the faster cycle than the moving velocity of the valve body 18, e.g. at a cycle equal to one-half of a dither cycle Td.

Current level control of driving current id (S103): The control device 6 controls the current level of the driving current id and controls the valve mechanism 14 to have the valve opening degree in accordance with the current level.

Figure 5:
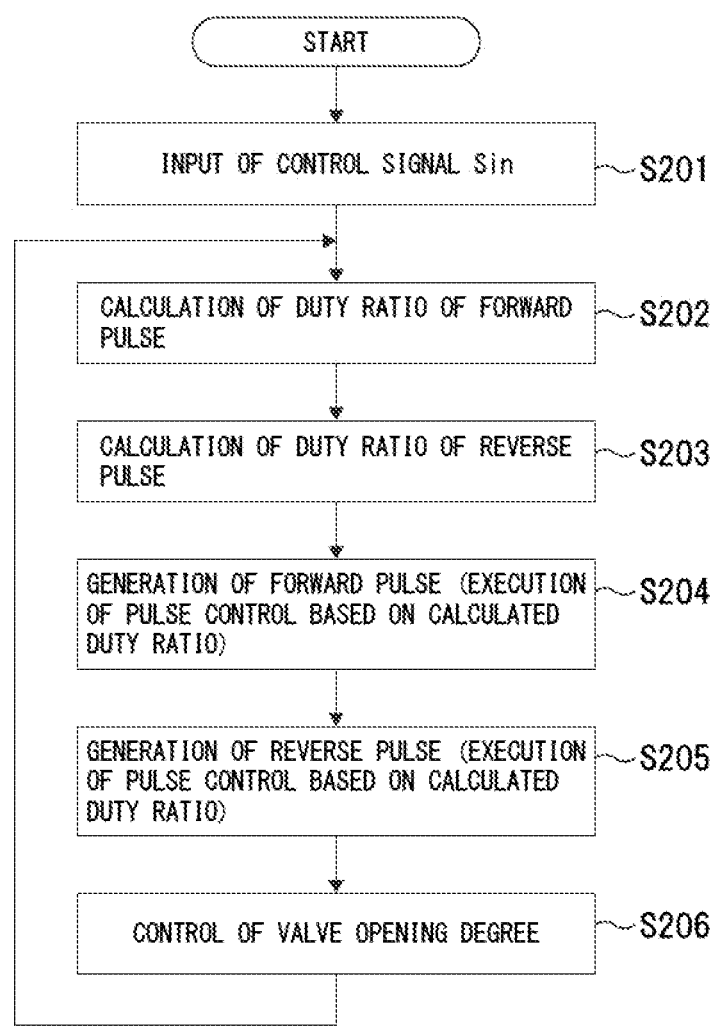
FIG. 5 is a flowchart showing an example of a polarity reversal and a level control of a driving current id in the control process.

FIG. 5 shows an example of a polarity reversal and a level control of the driving current id in the control process. The control process includes input of control signal Sin (S201), calculation of duty ratio of forward pulse (S202), calculation of duty ratio of reverse pulse (S203), generation of forward pulse (execution of pulse control based on the calculated duty ratio) (S204), generation of reverse pulse (execution of pulse control based on the calculated duty ratio) (S205), and control of valve opening degree (S206).

Input of control signal Sin (S201): The control device 6 receives a control signal Sin for control of the valve opening degree of the valve mechanism 14. The valve opening degree is controlled by a signal level of the control signal Sin.

Calculation of duty ratio of forward pulse (S202): The control device 6 calculates a duty ratio of a forward pulse except for a polarity control pulse Psw1 (polarity reversal portion) that will be described later.

Calculation of duty ratio of reverse pulse (S203): The control device 6 calculates a duty ratio of a reverse pulse except for a polarity control pulse Psw2 (polarity reversal portion) that will be described later.

Generation of forward pulse (execution of pulse control based on the calculated duty ratio) (S204): The control device 6 generates the forward pulse for generation of a forward driving current id fed to the proportional solenoid 28. The forward pulse contains, at its leading portion as a polarity reversal portion, the polarity control pulse Psw1 for reversing the current direction of the driving current id faster than the movement of the valve body 18. The polarity control pulse Psw1 is larger in pulse width than the other forward pulse and is a high duty ratio pulse. The polarity reversal portion of the forward pulse is used for switching the polarity of a reverse driving current id to the forward driving current id.

Generation of reverse pulse (execution of pulse control based on the calculated duty ratio) (S205): The control device 6 generates a reverse pulse for generation of the reverse driving current id fed to the proportional solenoid 28. The reverse pulse contains, at its leading portion as the polarity reversal portion, the polarity control pulse Psw2 for reversing the current direction of the driving current id faster than the movement of the valve body 18. The polarity control pulse Psw2 is larger in pulse width than the other reverse pulse and is a high duty ratio pulse. The polarity reversal portion of the reverse pulse is used for switching the polarity of the forward driving current id to the reverse driving current id.

Control of valve opening degree (S206): The control device 6 controls the current level of the driving current id in accordance with the signal level of the control signal Sin, to control the valve opening degree.

<Polarity Reversal and Level Control of Driving Current Id and Attraction Force F>

Figure 6:
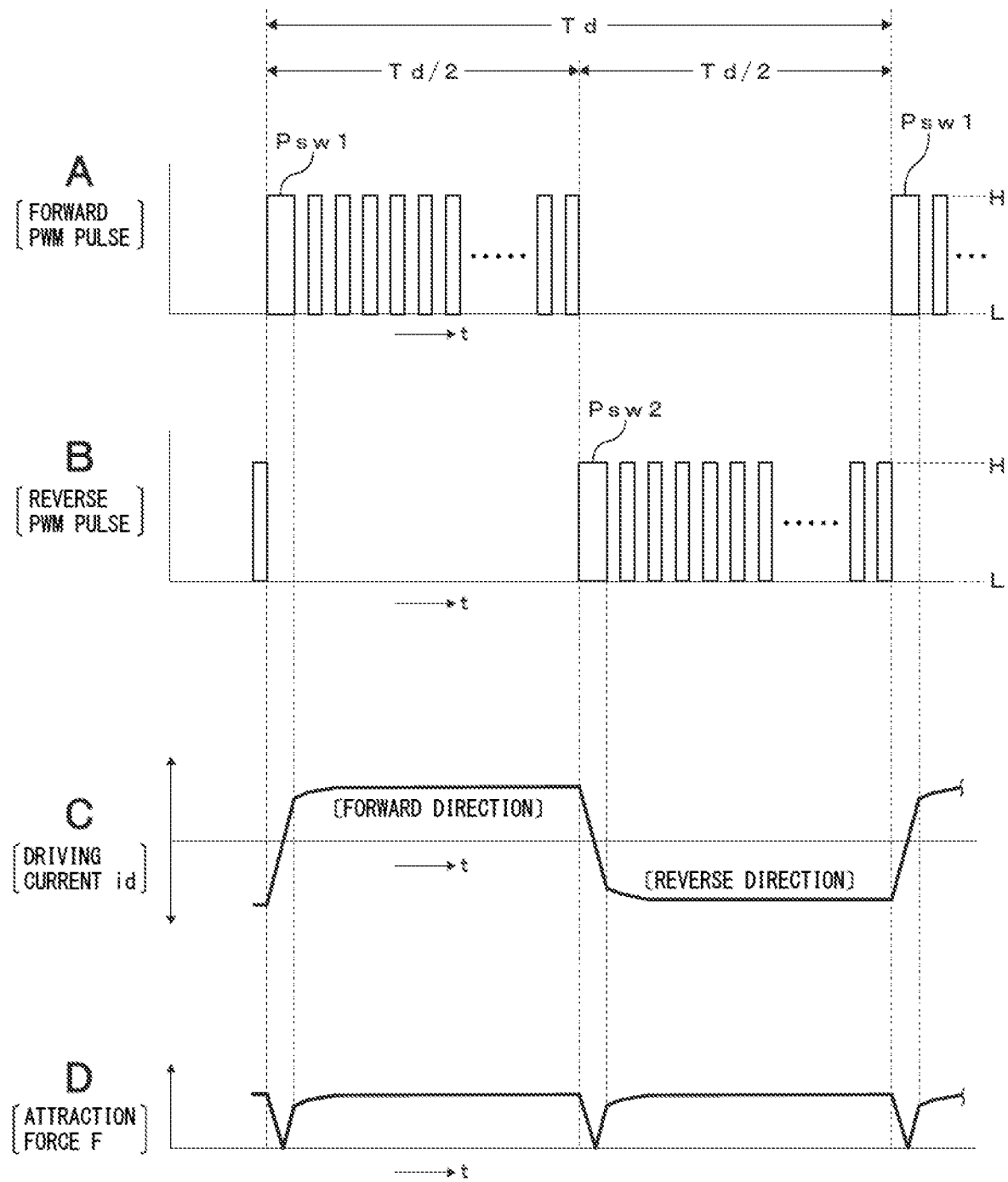
FIG. 6 is a view showing the polarity reversal and the level control of the driving current and generation of an attraction force F, based on the PWM control.

A of FIG. 6 shows a forward PWM pulse that is an example of the forward pulse. This forward pulse is generated in a period equal to one-half (=Td/2) of the dither cycle Td and contains the polarity control pulse Psw1 as the polarity reversal portion at the leading portion. The polarity control pulse Psw1 has a certain pulse width for shortening a polarity reversal period in which the reverse driving current id is switched to the forward direction.

On the contrary, the duty ratio of the forward PWM pulse except for the polarity control pulse Psw1 is controlled by the control signal Sin. Although in A of FIG. 6 the duty ratio is constant for convenience of description, the duty ratio is controlled to be different in accordance with the valve opening degree.

B of FIG. 6 shows a reverse PWM pulse that is an example of the reverse pulse. This reverse pulse is generated in a period equal to one-half (=Td/2) of the dither cycle Td and contains the polarity control pulse Psw2 as the polarity reversal portion at the leading portion. The polarity control pulse Psw2 has a certain pulse width for shortening the polarity reversal period in which the forward driving current id is switched to the reverse direction. In this embodiment, the polarity control pulses Psw1 and Psw2 have the same pulse width.

On the contrary, the duty ratio of the reverse PWM pulse except for the polarity control pulse Psw2 is controlled by the control signal Sin. Although in B of FIG. 6 the duty ratio is constant for convenience of description, the duty ratio is controlled to be different in accordance with the valve opening degree.

C of FIG. 6 shows the driving current id flowing in the forward direction or the reverse direction. The driving current id is switched from the reverse driving current id to the forward driving current id by the polarity control pulse Psw1 every half cycle of the dither cycle Td. Similarly, the driving current id is switched from the forward driving current id to the reverse driving current id by the polarity control pulse Psw2 every half cycle of the dither cycle Td.

The current level of the driving current id with this polarity reversal is controlled depending on the duty ratio of the forward PWM pulse or the reverse PWM pulse.

D of FIG. 6 shows the attraction force F acting on the movable magnetic pole 26 and the yoke 32 (fixed magnetic pole). The proportional solenoid 28 is excited by the driving current id having the polarity reversal and the controlled level, so that the movable magnetic pole 26 and the yoke 32 are magnetized. Although magnetic pole pair is reversed to different magnetic pole pair every half cycle of the dither cycle Td, the attraction force F occurring between the movable magnetic pole 26 and the yoke 32 depends on the level of the driving current id.

<Effects of First Embodiment>

According to the first embodiment, any of the following effects can be obtained.

(1) Since the magnetic poles of the movable magnetic pole 26 and the yoke 32 generated by the proportional solenoid 28 are reversed by reversing the polarity of the driving current id at one-half cycle (=Td/2) of the dither cycle Td, the residual magnetism can be offset. This polarity reversal does not affect the control of the valve opening degree since it is performed at a faster cycle than the opening/closing of the valve mechanism 14.

(2) Since the current level of the driving current id is controlled by the duty ratio of the forward PWM pulse or the reverse PWM pulse at the time interval of the polarity reversal, the valve opening degree of the valve mechanism 14 can be controlled by the current level of the driving current id without being affected by the polarity reversal of the driving current id.

Second Embodiment

Figure 7:
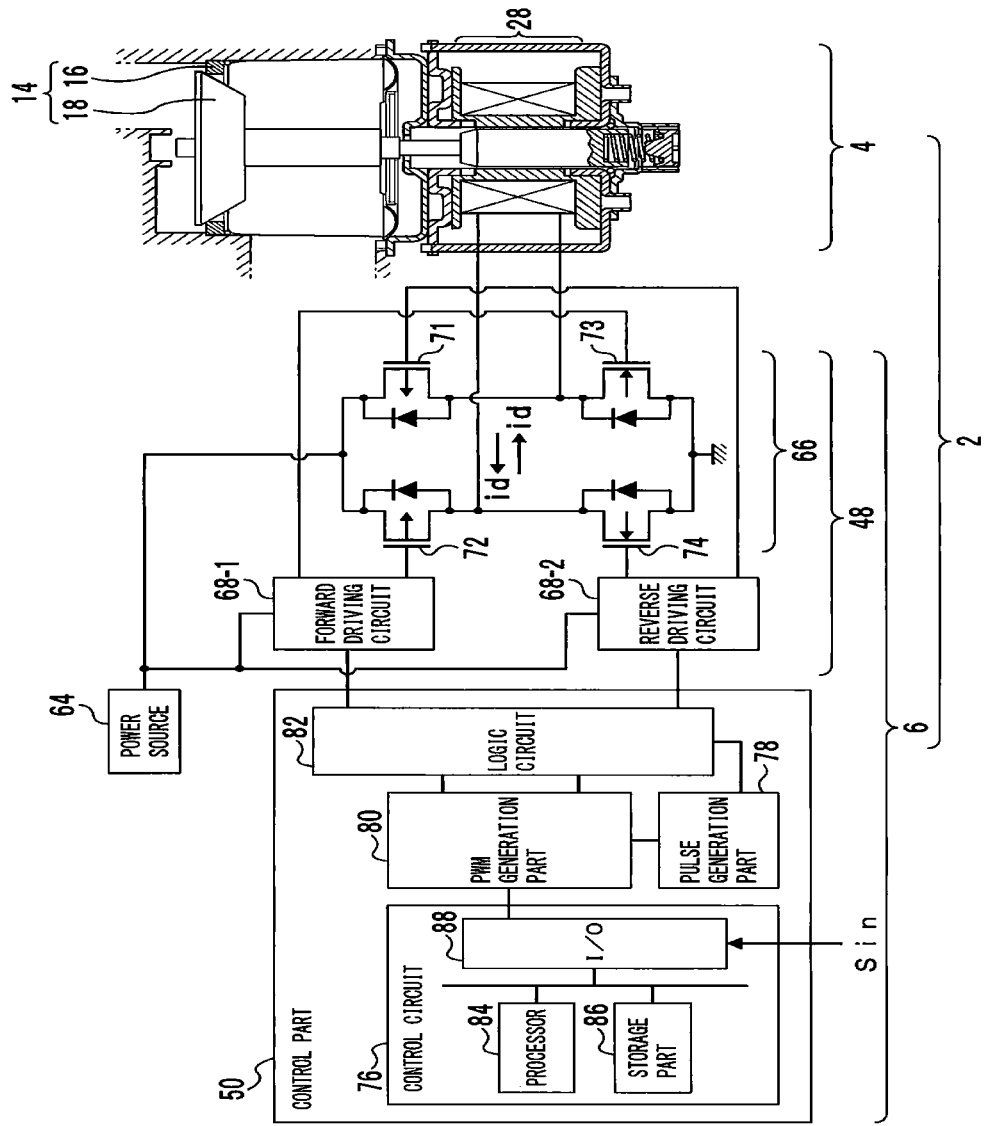
FIG. 7 is a view showing a proportional solenoid valve system according to a second embodiment.

FIG. 7 shows a proportional solenoid valve system 2 according to a second embodiment. In the configuration in FIG. 7, the same parts as that in FIG. 1 are designated by the same reference signs.

The driving part 48 includes e.g. a power source 64, a drive bridge circuit 66, a forward driving circuit 68-1, and a reverse driving circuit 68-2. The power source 64 constitutes a current source of the driving current id.

The drive bridge circuit 66 includes e.g. p-channel field effect transistors (Pch-FETs) 71 and 72 and n-channel field effect transistors (Nch-FETs) 73 and 74.

The forward driving circuit 68-1 receives a forward PWM pulse from the control part 50 and feeds a forward driving current id from the drive bridge circuit 66 to the proportional solenoid 28. On the other hand, the reverse driving circuit 68-2 receives the reverse PWM pulse from the control part 50 and feeds the reverse driving current id from the drive bridge circuit 66 to the proportional solenoid 28. That is, at one-half cycle (=Td/2) of the dither cycle Td, the forward driving current id flows to the proportional solenoid 28 by the conduction of the Pch-FET 72 and the Nch-FET 73, while at next one-half cycle (=Td/2) of the dither cycle Td, the reverse driving current id flows to the proportional solenoid 28 by the conduction of the Pch-FET 71 and the Nch-FET 74.

The control part 50 includes a control circuit 76, a pulse generation part 78, a PWM generation part 80, and a logic circuit 82. The control circuit 76 is configured from a microcomputer and includes a processor 84, a storage part 86, and an input/output part (I/O) 88. The processor 84 runs a control program stored in the storage part 86, to execute a control such as a pulse width control in accordance with the control signal Sin.

Such controls and control information include:
a) control information for generating the driving current id;
b) control information for reversing the polarity of the driving current id at a faster cycle than the movement of the valve body 18;
c) control information for controlling the valve opening degree by the current level of the driving current id;
d) calculation of the duty ratio of a forward pulse except for a polarity control pulse;
e) calculation of the duty ratio of a reverse pulse except for a polarity control pulse;
f) generation of the forward pulse containing a control pulse for switching the polarity of the reverse driving current id to the forward direction (execution of the calculated pulse control); and
g) generation of the reverse pulse containing a control pulse for switching the polarity of the forward driving current id to the reverse direction (execution of the calculated pulse control).

The storage part 86 is an example of a recording medium that stores a program of the present disclosure. This storage part 86 is in the form of a read-only memory (ROM), a random-access memory (RAM), an electrically erasable programmable read-only memory (EEPROM), etc. and is used for generation and storage of various types of control information.

The I/O 88 captures the control signal Sin and generates control information.

The pulse generation part 78 generates a clock pulse with a certain cycle and divides or multiplies the clock pulse to generate a pulse with a certain cycle.

The PWM generation part 80 has a forward PWM pulse generation function and a reverse PWM pulse generation function to generate the forward PWM pulse or the reverse PWM pulse having a duty ratio in accordance with the signal level of the control signal Sin, to output the forward PWM pulse or the reverse PWM pulse to the logic circuit 82.

The logic circuit 82 receives a control pulse synchronized with one-half cycle of the dither cycle Td from the pulse generation part 78 and outputs the forward PWM: pulse and the reverse PWM pulse in synchronism with Td/2. The forward PWM pulse is provided to the forward driving circuit 68-1, while the reverse PWM pulse is provided to the reverse driving circuit 68-2.

<Effects of Second Embodiment>

According to the second embodiment, any of the following effects can be obtained.

(1) Since the magnetic poles of the movable magnetic pole 26 and the yoke 32 generated by the proportional solenoid 28 are reversed by reversing the polarity of the driving current id at one-half cycle (=Td/2) of the dither cycle Td, the residual magnetism can be offset and hysteresis characteristics can be improved.

(2) Since the current level of the driving current id is controlled by the duty ratio of the forward PWM pulse or the reverse PWM pulse at the time interval of the polarity reversal, controllability of the valve opening degree of the valve mechanism 14 can be enhanced by the current level of the driving current id without being affected by the polarity reversal of the driving current id.

Third Embodiment

Figure 8:
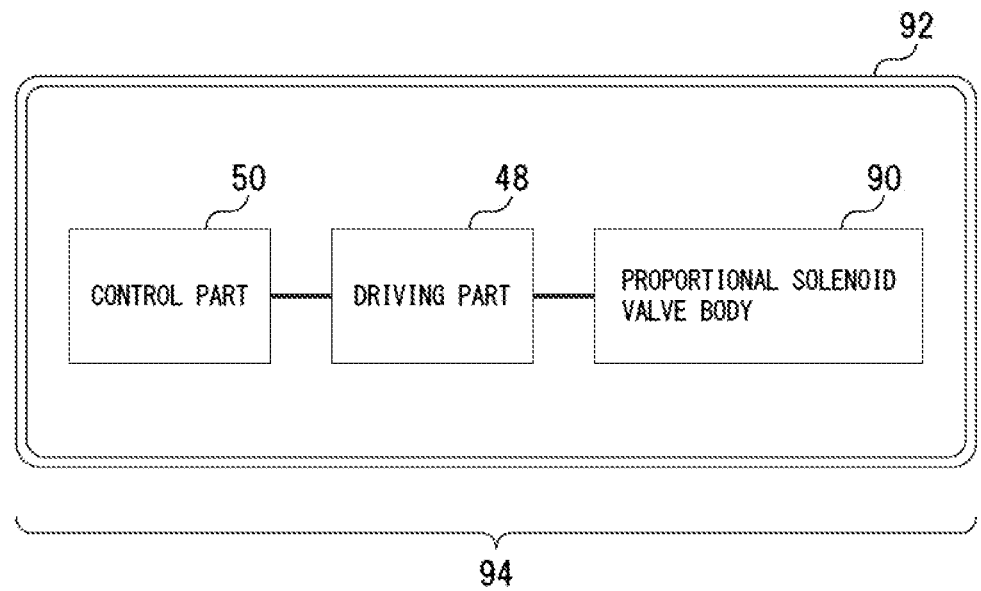
FIG. 8 is a view showing a proportional solenoid valve according to a third embodiment.

FIG. 8 shows a proportional solenoid valve 94 according to a third embodiment. In the configuration of FIG. 8, the same parts as that in FIG. 1 are designated by the same reference signs.

In the third embodiment, a proportional solenoid valve body 90 is a valve function part of the proportional solenoid valve 4 of the first embodiment.

The proportional solenoid valve body 90, the driving part 48, and the control part 50 are installed in a housing 92. Therefore, in this embodiment, a proportional solenoid valve 94 is configured to equip the control functions integrally.

According to such a configuration, the same effects as in the first embodiment or the second embodiment can be obtained.

Fourth Embodiment

Figure 9:
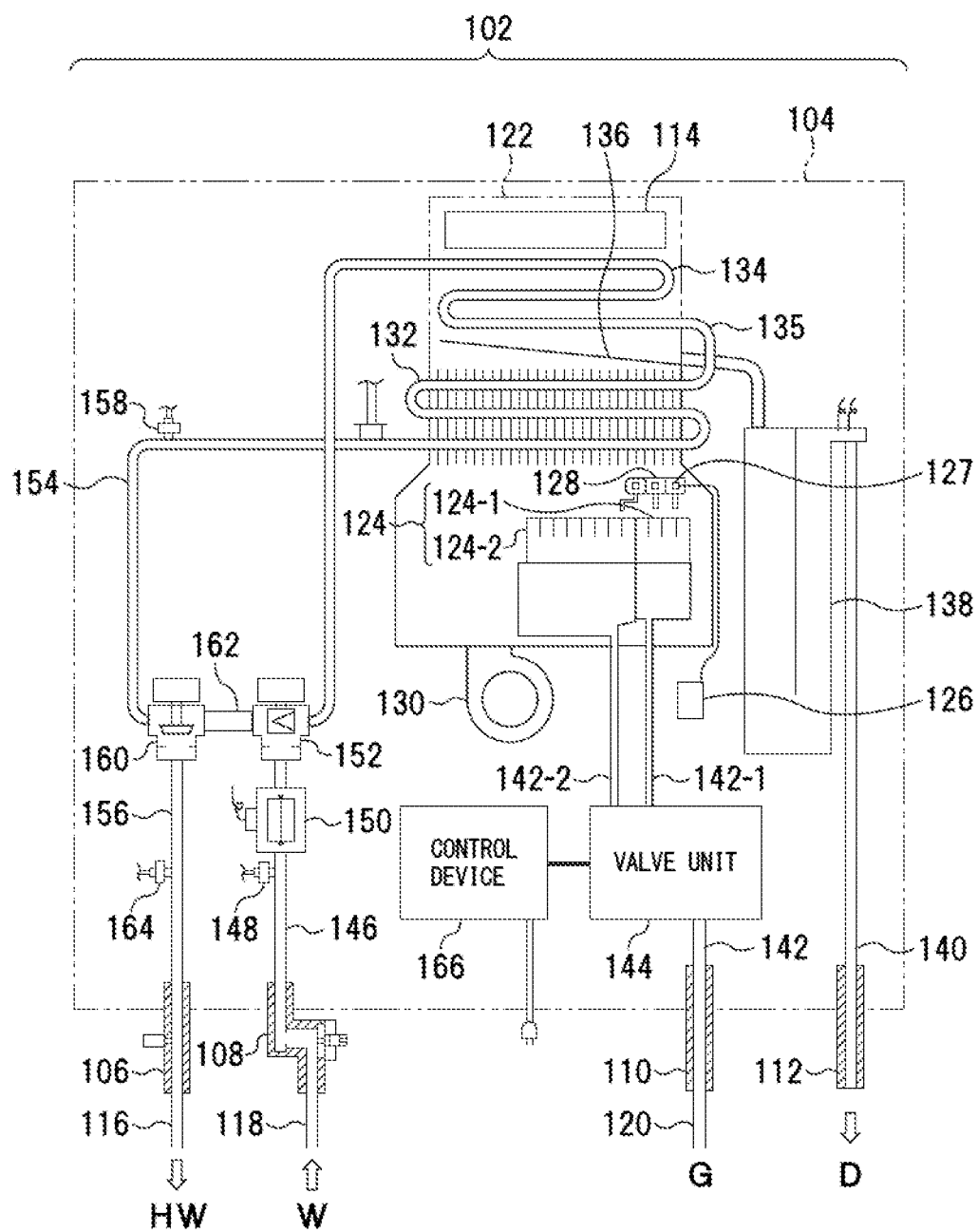
FIG. 9 is a view showing a hot water supply device according to a fourth embodiment.

FIG. 9 shows a hot water supply device according to a fourth embodiment. The configuration shown in FIG. 9 is an example and the present disclosure is not limited to such a configuration.

In a heat source device for use in the hot water supply device that heats supply water to provide hot water, a proportional valve is used for controlling the fuel gas supply volume in accordance with the hot water demand. Known as the proportional valve is a proportional solenoid valve that controls the valve opening degree by excitation of a proportional solenoid.

There is a burner e.g. having two different burner parts that allows selection of one of combustion modes including: igniting only one burner part if the hot water demand is small (first combustion); igniting only the other burner part if the hot water demand is middle (second combustion); and igniting the two burner parts simultaneously if the hot water demand further increases (third combustion). When the fuel control is performed by the proportional solenoid valve to deal with such increase/decrease of the hot water demand, hysteresis exists in each of the first combustion, the second combustion, or the third combustion. Since this hysteresis brings about differences in the valve opening degree with the same driving current, there is a problem that differences occur in the CO value and NOx value generated by combustion, i.e. that the combustion state changes. This change in the combustion state is remarkable in e.g. the first combustion where the volume of combustion gas is small.

There is a problem that the hysteresis characteristics affect the hot water outlet temperature to cause a deviation from the hot water outlet temperature of the hot water demand.

There is a problem that it takes time on a production line to set a secondary pressure for alleviating the influence of the hysteresis characteristics, needing a considerable amount of time for setting.

Thus, in this embodiment, an example of a configuration is shown where control characteristics in the fuel control are improved by reducing or avoiding the influence of the residual magnetism on the proportional solenoid valve.

A hot water supply device 102 is an example of a heat source device of the present disclosure. In the hot water supply device 102, a housing 104 includes a hot water supply port 106, a water supply port 108, a fuel gas port 110, a drain port 112, and an exhaust opening 114. The housing 104 is disposed on e.g. a wall surface of a building.

A hot water delivery pipe 116 delivering hot water HW to a demand location is connected to the hot water supply port 106. A water supply pipe 118 such as a tap water pipe not shown for supplying supply water W is connected to the water supply port 108. A gas pipe 120 supplying fuel gas G is connected to the fuel gas port 110. The drain port 112 is used to drain drainage water D generated by heat exchange of combustion heat. The exhaust opening 114 discharges heat-exchanged combustion exhaust.

A combustion chamber 122 is disposed in a center of the housing 104. A burner 124, an igniter 126, an ignition plug 127, a flame rod 128, an air supply fan 130, a primary heat exchanger 132, a secondary heat exchanger 134, and a drain receiver 136 are disposed in or on the combustion chamber 122.

The burner 124 includes e.g. first and second burner parts 124-1 and 124-2 each having a different burner face so as to allow combustion at only the burner part 124-1, combustion at only the burner part 124-2, or simultaneous combustion at the burner parts 124-1 and 124-2. When a hot water demand occurs, the igniter 126 and the ignition plug 127 ignite fuel gas G of the burner 124, and the flame rod 128 detects combustion of the fuel gas G of the burner 124.

The air supply fan 130 takes in combustion air into the combustion chamber 122 during combustion at the burner 124. The primary heat exchanger 132 transfers mainly sensible heat of upstream combustion exhaust to supply water W, to heat supply water W. The secondary heat exchanger 134 transfers mainly latent heat of downstream combustion exhaust to supply water W, to heat supply water W. The secondary heat exchanger 134 is disposed upstream, on a path for supply water W, of the primary heat exchanger 132 and is connected in series to the primary heat exchanger 132 via a coupling pipe 135.

The drain receiver 136 receives drainage water D generated by the heat exchange of the secondary heat exchanger 134 and leads to a drain tank 138. Drainage water D reserved in the drain tank 138 leads through a drain discharge pipe 140 to the drain port 112.

Fuel gas G supplied to the fuel gas port 110 is led through a gas supply pipe 142 to a valve unit 144 and leads through gas supply pipes 142-1 and 142-2 to the burner parts 124-1 and 124-2, respectively. The valve unit 144 has: a master valve function of switching fuel gas G between supply state and cutoff state; a proportional valve function of adjusting supply of fuel gas G in accordance with the hot water demand; and a switching valve function of switching supply of fuel gas G to the burner parts 124-1 and A water supply pipe 146 supplying supply water W to the secondary heat exchanger 134 is disposed between the water supply port 108 and the secondary heat exchanger 134. A temperature sensor 148, a water volume sensor 150, and a water control valve 152 for mixing are disposed on the water supply pipe 146. The temperature sensor 148 detects a temperature of supply water W. The water volume sensor 150 detects the volume of supply water flowing through the water supply pipe 146. The water control valve 152 for mixing controls the mixture of supply water W and hot water HW heated by the primary heat exchanger 132 and the secondary heat exchanger 134.

Between the hot water supply port 106 and the primary heat exchanger 132, there are a hot water outlet pipe 154 toward the primary heat exchanger 132 and a hot water supply pipe 156 toward the hot water supply port 106. A temperature sensor 158 is disposed on the hot water outlet pipe 154. A water control valve 160 is disposed between the hot water outlet pipe 154 and the hot water supply pipe 156, and a bypass pipe 162 is connected between the water control valve 160 and the water control valve 152 for mixing. The water control valve 160 controls the outlet volume of hot water HW. A temperature sensor 164 is disposed on the hot water supply pipe 156.

A control device 166 captures: a detected water volume from the water volume sensor 150; a detected temperature indicative of a supply water temperature from the temperature sensor 148; a detected temperature indicative of a hot water outlet temperature from the temperature sensor 158; and a detected temperature indicative of a hot water supply temperature from the temperature sensor 164. The control device 166 acquires these pieces of detection information so that the combustion gas volume is controlled by the valve unit 144, to thereby achieve hot water supply at the hot water supply temperature controlled to a set temperature.

Figure 10:
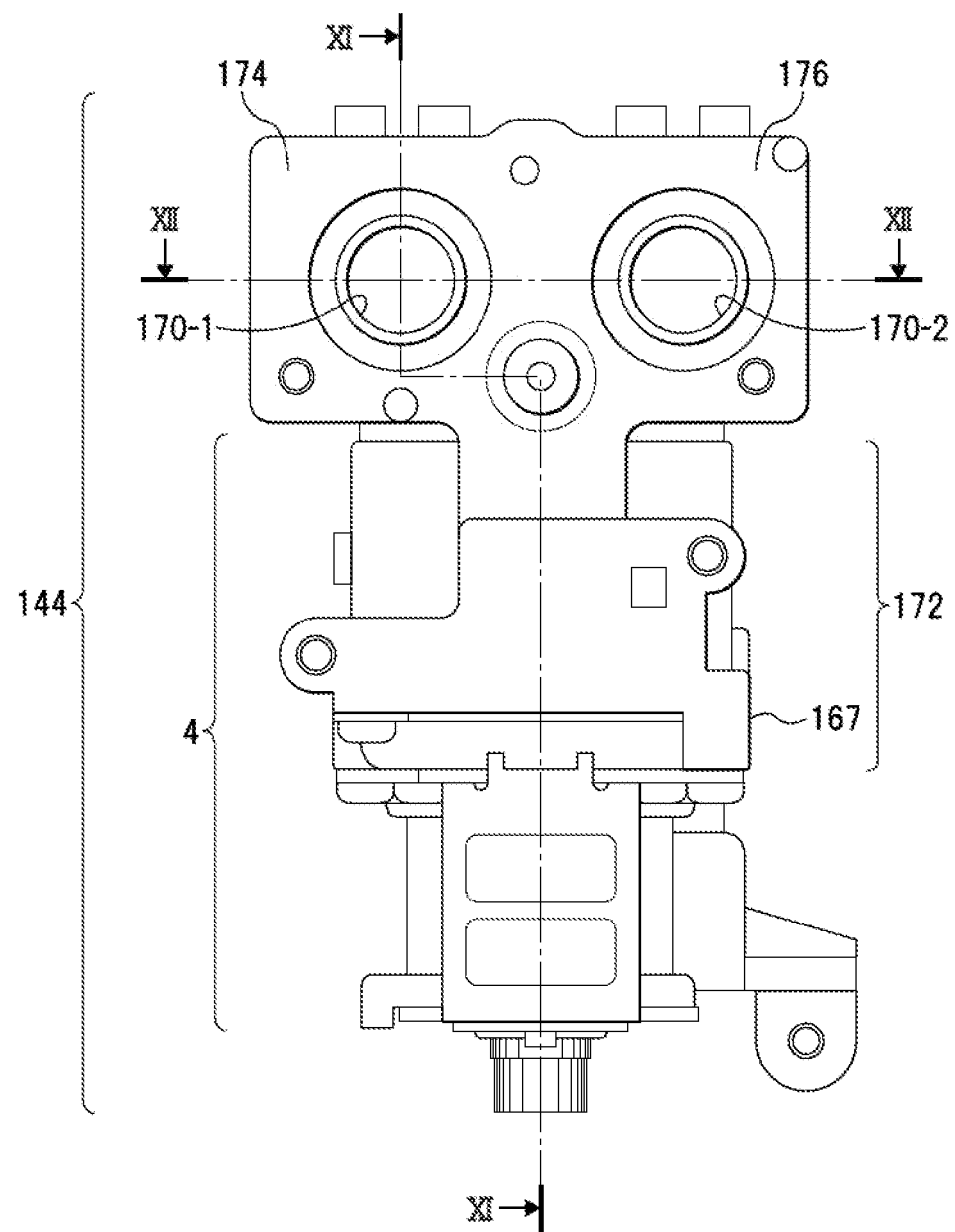
FIG. 10 is a front view showing a valve unit.
Figure 11:
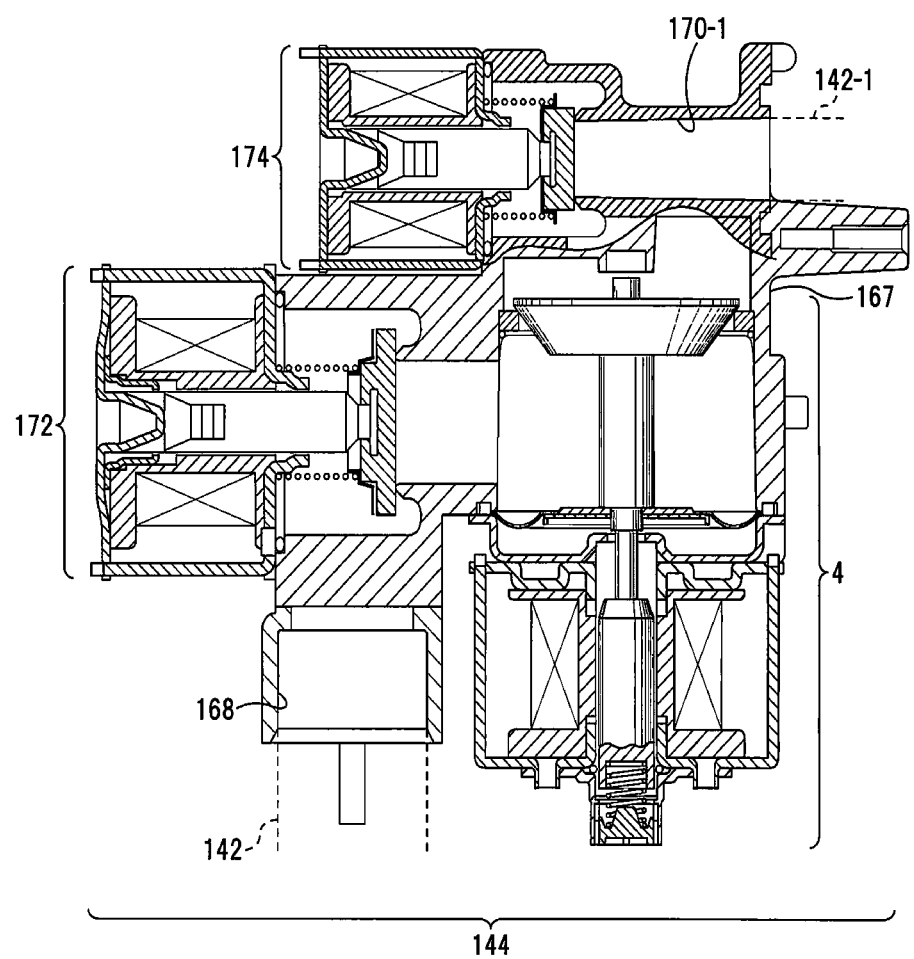
FIG. 11 is a cut end face view of the valve unit taken along line XI-XI of FIG. 10.
Figure 12:
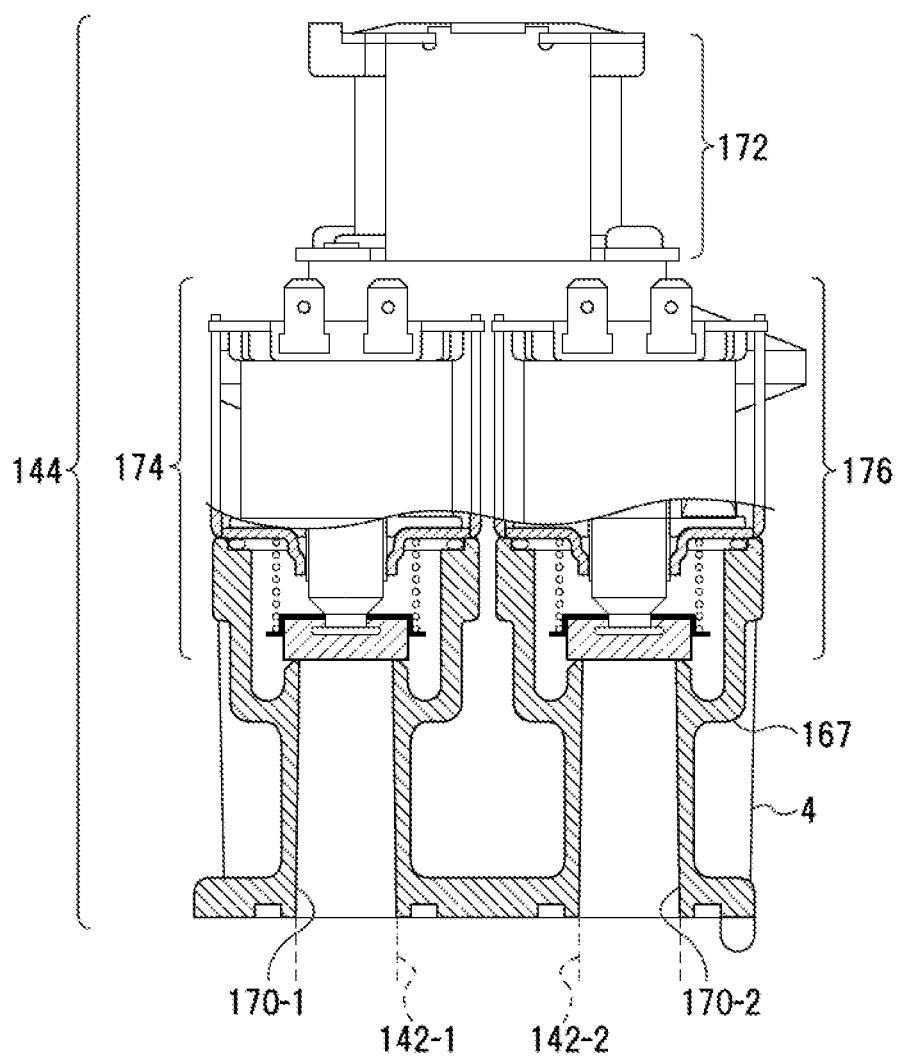
FIG. 12 is a cut end face view of the valve unit taken along line XII-XII of FIG. 10.

FIG. 10 shows a front view of the valve unit 144, FIG. 11 shows a cut end face taken along line XI-XI of FIG. 10, and FIG. 12 shows a cut end face taken along line XII-XII of FIG. 10. The configuration of the valve unit 144 shown in FIGS. 10 to 12 is an example and the present disclosure is not limited to such a configuration.

In the valve unit 144, a valve unit housing 167 includes an inlet port 168, and a first outlet port 170-1 and a second outlet port 170-2. An electromagnetic valve 172 is disposed toward the inlet port 168. An electromagnetic valve 174 is disposed toward the outlet port 170-1. An electromagnetic valve 176 is disposed toward the outlet port 170-2. The proportional solenoid valve 4 is disposed between the electromagnetic valve 172 and the electromagnetic valves 174 and 176.

Figure 13:
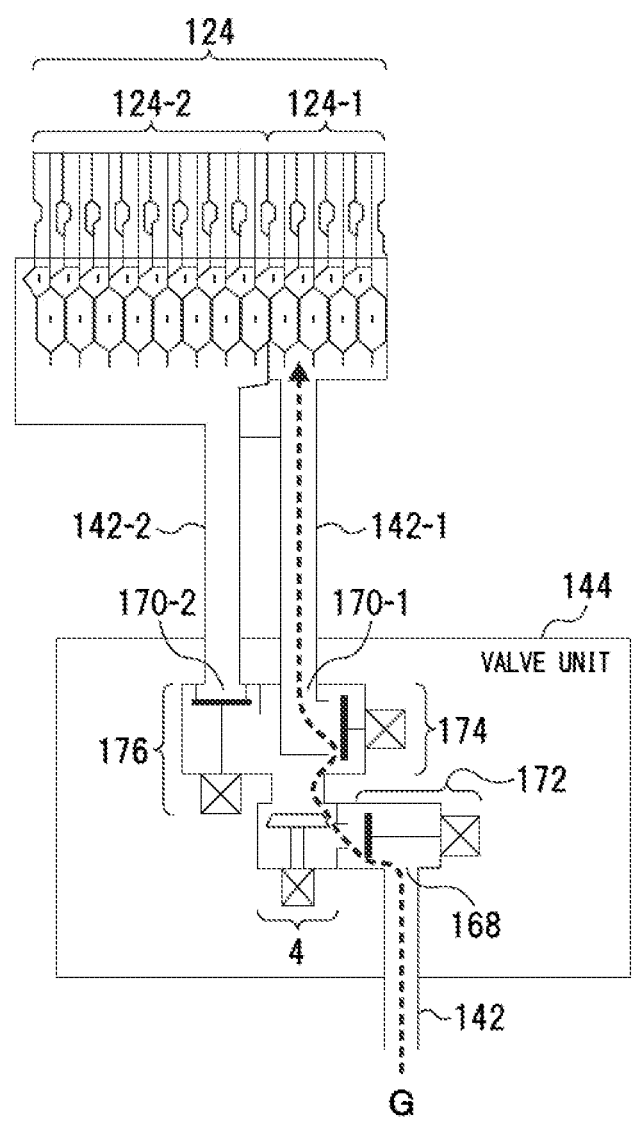
FIG. 13 is a view showing an operation of the valve unit.

According to this valve unit 144, as shown in FIG. 13, the outlet port 170-1 is selected by controlling the electromagnetic valve 172 and the electromagnetic valve 174 on one hand to the open state. By controlling the valve opening degree of the proportional solenoid valve 4 in this state, the volume of fuel gas coming out of the outlet port 170-1 is controlled.

Figure 14:
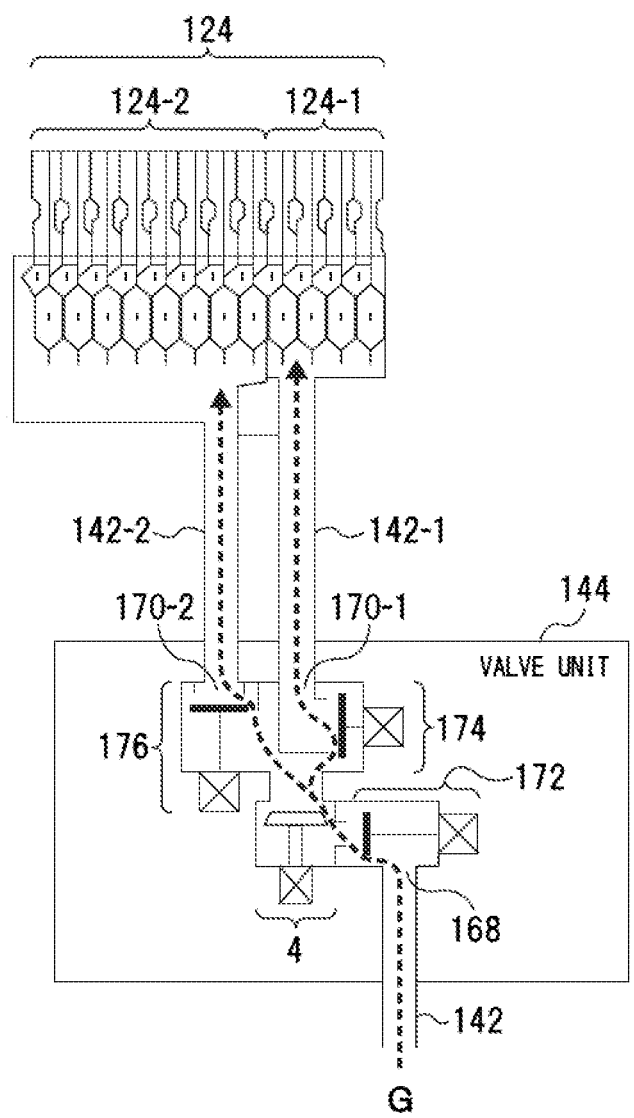
FIG. 14 is a view showing an operation of the valve unit.

As shown in FIG. 14, both the outlet ports 170-1 and 170-2 are selected by controlling the electromagnetic valve 172 and both the electromagnetic valves 174 and 176 to the open state. By controlling the valve opening degree of the proportional solenoid valve 4 in this state, the volume of fuel gas coming out of both the outlet ports 170-1 and 170-2 is controlled.

The valve unit 144 mounted on the hot water supply device 102 may have e.g. the configurations of the proportional solenoid valve system 2, the valve driving mechanism 62, or the proportional solenoid valve 94, shown in the first to third embodiments.

<Hot Water Supply Control>

Figure 15:
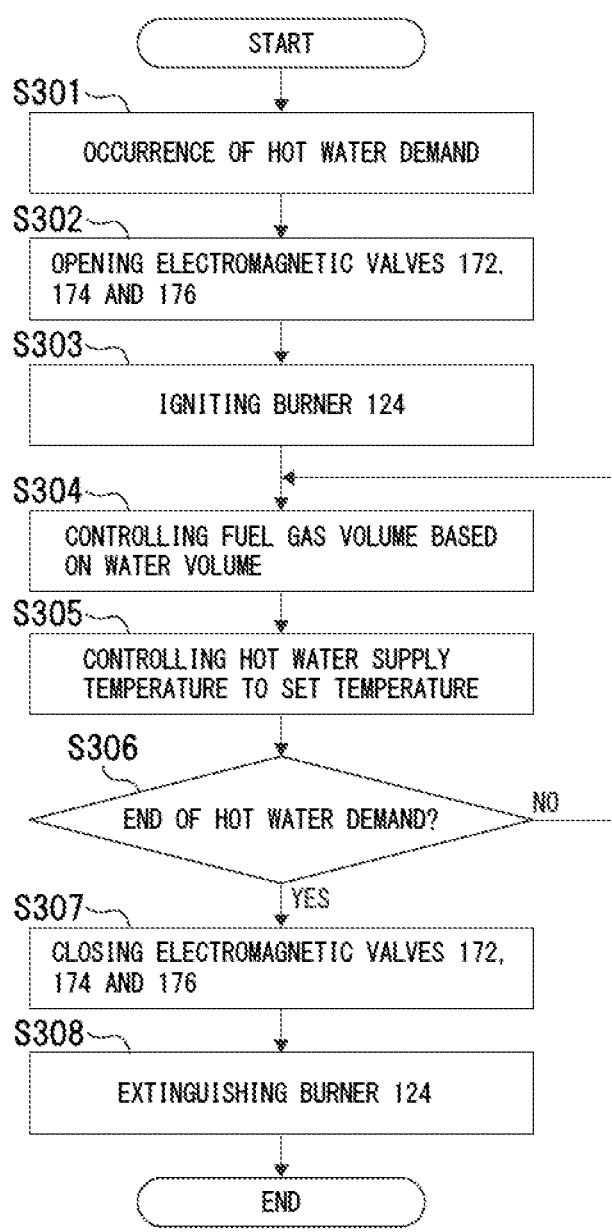
FIG. 15 is a flowchart showing a hot water supply control.

FIG. 15 shows a hot water supply control of the hot water supply device 102. Control processes of the hot water supply control include occurrence of hot water demand (S301), opening the electromagnetic valves 172, 174, and 176 (S302), igniting burner 124 (S303), controlling fuel gas volume based on the water volume (S304), controlling hot water supply temperature to set temperature (S305), determining end of the hot water demand (S306), closing electromagnetic valves 172, 174, and 176 (S307), extinguishing burner 124 (S308), etc.

Occurrence of hot water demand (S301): A hot water demand occurs for example when opening e.g. a hot water supply valve connected to the hot water delivery pipe 116. The hot water demand encourages the supply of supply water W from the water supply pipe 118. This supply water W is detected by the water volume sensor 150, whose detection output is captured in the control device 166.

Opening electromagnetic valves 172, 174, and 176 (S302): In response to the occurrence of the hot water demand, the control device 166 opens the electromagnetic valves 172, 174, and 176. This allows fuel gas G to flow into the burner 124.

Igniting burner 124 (S303): In response to the occurrence of the hot water demand, the control device 166 activates the igniter 126 so that the ignition plug 127 ignites the burner 124.

Controlling fuel gas volume based on water volume (S304): The control device 166 captures, as fuel gas volume control signals, a detected water volume from the water volume sensor 150, detection signals from the temperature sensor 148 etc. The control device 166 controls the opening degree of the proportional solenoid valve 4 of the valve unit 144.

Controlling hot water supply temperature to set temperature (S305): The control device 166 can set a desired hot water supply temperature by initial setting or the user. By receiving detected temperatures from the temperature sensors 148, 158, and 164 and detected water volume from the water volume sensor 150, the control device 166 controls the hot water supply temperature to the set temperature to supply hot water.

Determining end of hot water demand (S306): The hot water supply volume is detected by the water volume sensor 150. The control device 166 determines the end of the hot water demand, based on the detected water volume from the water volume sensor 150.

Closing electromagnetic valves 172, 174, and 176 (S307): In response to the end of the hot water demand, the control device 166 closes the electromagnetic valves 172, 174, and 176.

Thus, supply of fuel gas G to the burner 124 is stopped.

Extinguishing burner 124 (S308): The burner 124 is extinguished by the stop of supply of fuel gas G to the burner 124.

<Effects of Fourth Embodiment>

According to the fourth embodiment, any of the following effects can be obtained.

(1) The same effects as in the first to third embodiments can be obtained.

(2) Since the influence of the residual magnetism in the proportional solenoid valve 4 can be alleviated or avoided, the difference in the valve opening degree for the driving current id is small between the directions of increase and decrease of fuel gas G, enabling difference between increase and decrease of fuel gas G to be prevented.

(3) The change in the combustion state is suppressed so that the combustion state can be stabilized.

(4) The controllability of the hot water supply control is enhanced so that the deviation of the hot water outlet temperature can be prevented between the directions of increase and decrease of fuel gas G.

(5) It becomes easy in the production line to set the gas secondary pressure after passage of the proportional solenoid valve, enabling the hot water supply device 102 to be produced at high efficiency.

Fifth Embodiment

Figure 16:
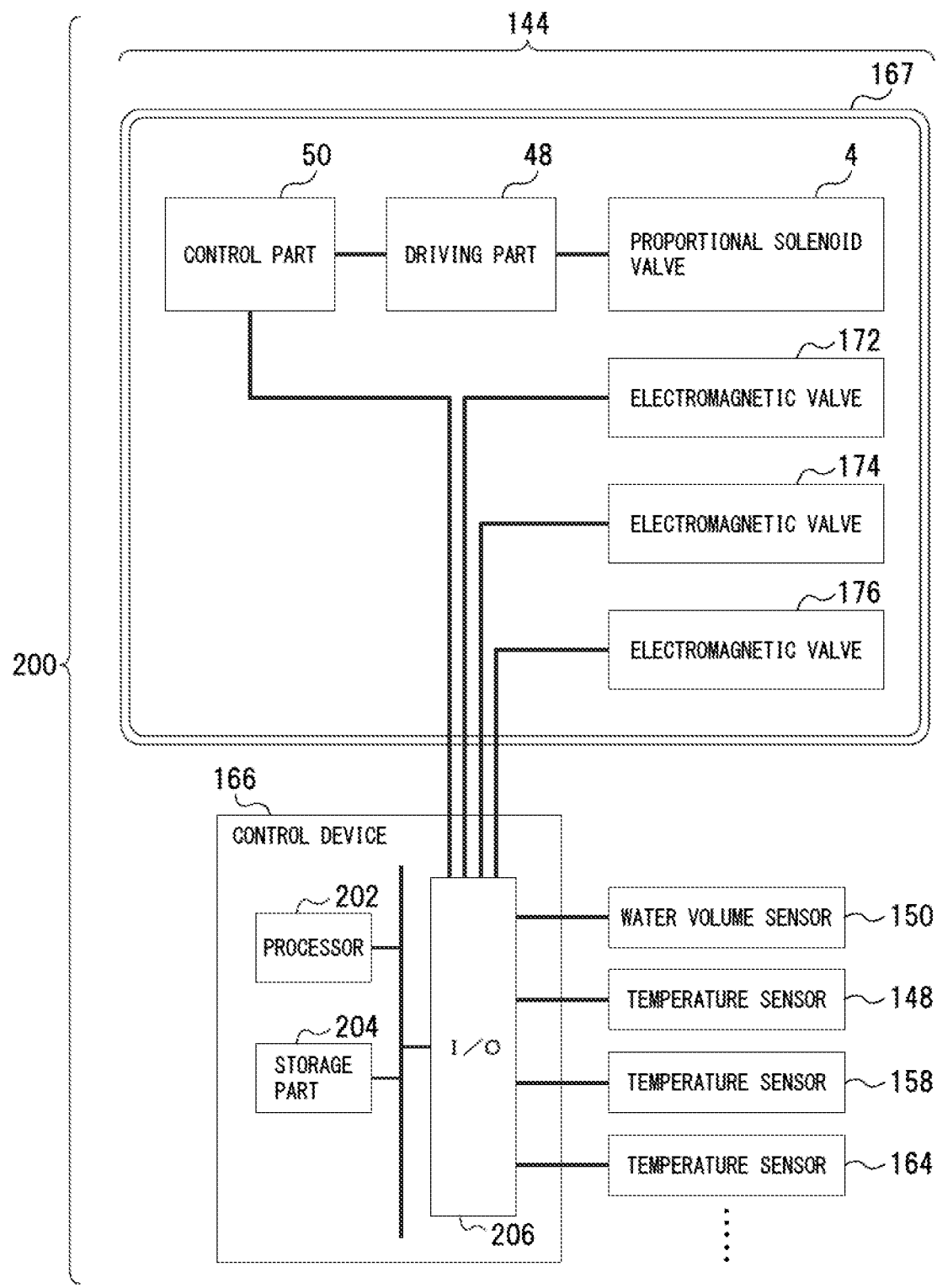
FIG. 16 is a view showing a valve unit and a control system according to a fifth embodiment.

FIG. 16 shows a valve unit 144 and a control system 200, according to a fifth embodiment. In the configuration of FIG. 16, the same parts as that in FIGS. 1 and 7 are designated by the same reference signs.

In the proportional solenoid valve system 2 shown in FIG. 7, the control device 6 includes the driving part 48 and the control part 50. On the contrary, the control system 200 includes, e.g. as shown in FIG. 16, the driving part 48 and the control part 50 together with the proportional solenoid valve 4 within the interior of the valve unit housing 167. The control device 166 is disposed outside the valve unit 144.

The control device 166 is configured from e.g. a computer and includes a processor 202, a storage part 204, and an I/O 206. The processor 202 executes a hot water supply control program or the like stored in the storage part 204. This information processing includes controls of hot water supply temperature or the like using detection information from the water volume sensor 150, the temperature sensors 148, 158, and 164, etc.

In the control device 166, the processor 202 may be the already-described processor 84, the storage part 204 may be the already-described storage part 86, and the I/O 206 may be the I/O 88.

<Effects of Fifth Embodiment>

According to such a configuration, any of the following effects can be obtained.

(1) The same effects as in the first to fourth embodiments can be obtained.

(2) The control function of the proportional solenoid valve 4 can be integrated in the valve unit 144 to reduce the size of the control device 166 and facilitate the maintenance.

[Experiment Results]

Figure 17:
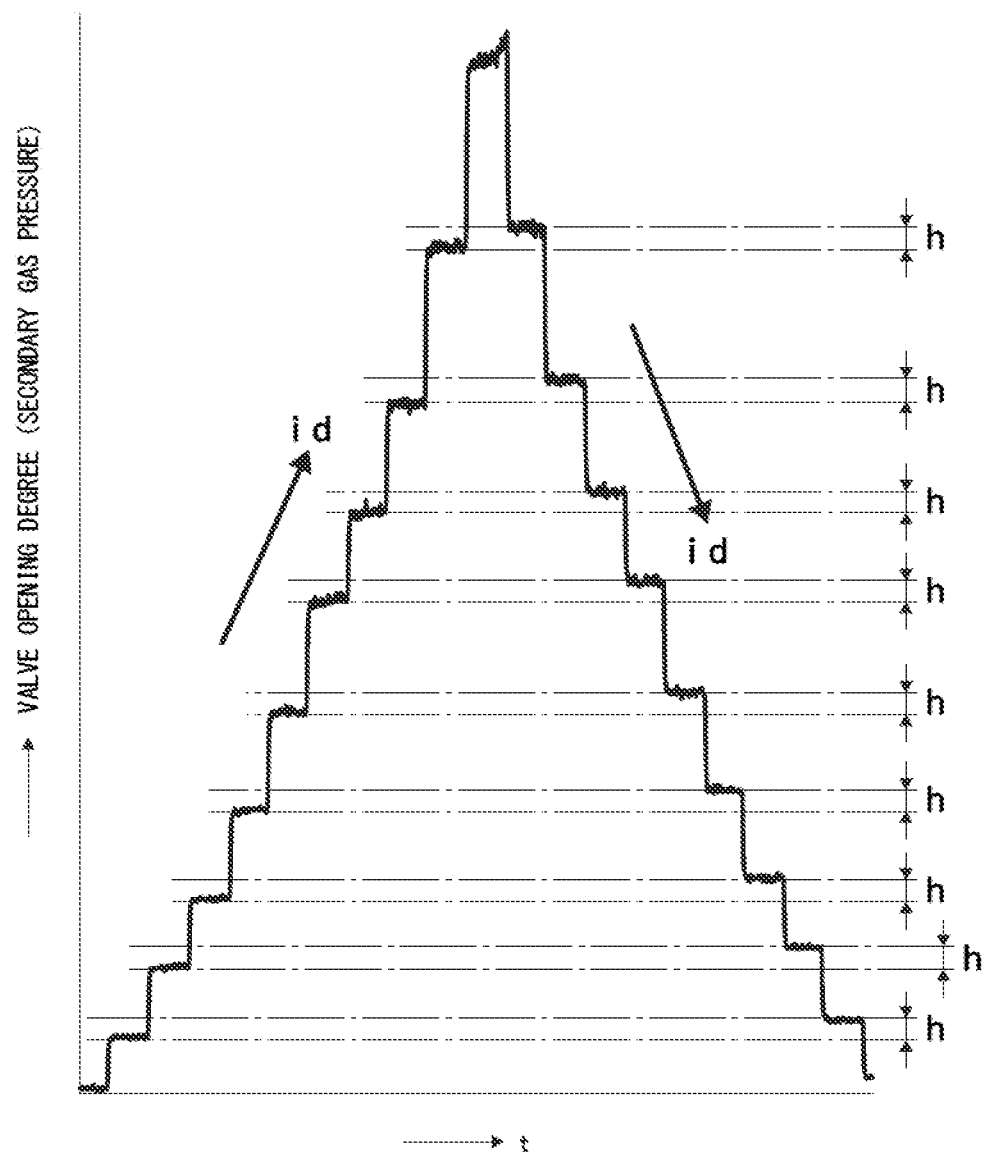
FIG. 17 is a view showing operation characteristics of the proportional solenoid valve driven by a driving current without the polarity reversal.

FIG. 17 shows operation characteristics of the proportional solenoid valves 4 and 94 driven by a driving current id without the polarity reversal, where the horizontal axis represents time and the vertical axis represents the valve opening degree or the secondary gas pressure. The valve opening degree of the proportional solenoid valves 4 and 94 is proportional to the secondary gas pressure of the proportional solenoid valves 4 and 94 in operation characteristics.

In the case of exciting the proportional solenoid 28 by the driving current id without the polarity reversal, the influence of the residual magnetism cannot be eliminated since it is excited by the driving current id in one direction. That is, the driving current id in the same direction as that of the residual magnetism enhances the magnetism, whereas the driving current id in the opposite direction to that of the residual magnetism impairs the magnetization caused by the driving current id due to offset of the residual magnetism. This results in remarkable influence of a hysteresis h between the control signal Sin and the valve opening degree or the secondary gas pressure.

Figure 18:
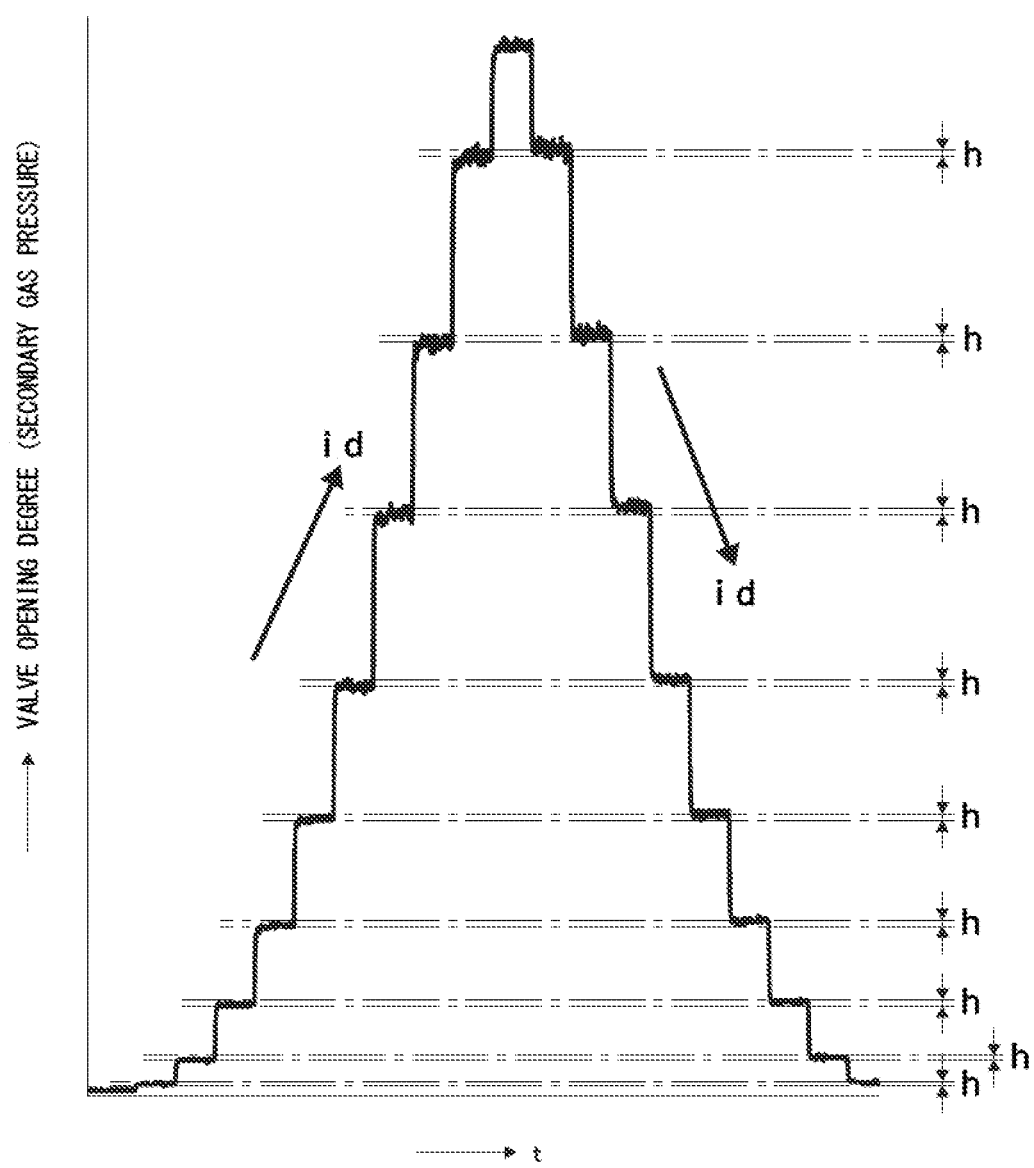
FIG. 18 is a view showing operation characteristics of the proportional solenoid valve driven by the driving current with the polarity reversal.

FIG. 18 shows operation characteristics of the proportional solenoid valves 4 and 94 driven by the driving current id with the polarity reversal, where similarly the horizontal axis represents time and the vertical axis represents the valve opening degree or the secondary gas pressure.

In the case of exciting the proportional solenoid 28 by the driving current id with the polarity reversal, the residual magnetism is offset by the driving current id due to the polarity reversal, whereupon a relationship unaffected by the residual magnetism can be obtained between the driving current id and the valve opening degree or the secondary gas pressure. As a result, the influence of the hysteresis h between the control signal Sin and the valve opening degree or the secondary gas pressure is improved to a negligible level.

Other Embodiments

Variants of the above-described embodiments will be enumerated below.

(1) Although in the above embodiments the PWM control is exemplified, controls other than the PWM control may be used for the control of the proportional solenoid valve.

(2) Although the reversal cycle of the driving current id is set to one-half of the dither cycle Td, the reversal cycle is not limited to the cycle of the embodiments as long as it is faster than the moving velocity of the valve body 18.

(3) Although in the above embodiments the polarity control pulse is exemplified as the polarity reversal portion contained in the forward pulse or the reverse pulse, the polarity control pulse may be not only a pulse generated by the PWM control but also a polarity reversal pulse generated separately from the PWM control. The polarity reversal pulse may have a cycle containing optimum polarity reversal timing for the polarity reversal of the driving current id and have a pulse width set to an optimum time width.

(4) Although the hot water supply device is exemplified as an example of the heat source device, the hot water supply device may be replaced with a reheating hot water supply device, a heating and hot water supply device, or the like.

As set forth hereinabove, the most preferred embodiments etc. of the configuration of the present invention have been described. The present invention is not limited to the above description and can variously be modified or altered by those skilled in the art, based on the gist of the present invention defined in the claims or disclosed in the description of embodiments. It is natural that such modifications or alterations be encompassed in the scope of the present invention.

INDUSTRIAL APPLICABILITY

The present invention can cancel the residual magnetism by reversing the magnetic pole relation between the movable magnetic pole and the fixed magnetic pole (yoke) by the driving current and can drive the valve mechanism by the magnetic force unaffected by the residual magnetism, thereby achieving improved hysteresis characteristics.

REFERENCE SIGNS LIST 2 proportional solenoid valve system
4, 94 proportional solenoid valve
6, 166 control device
8 fluid path
10 valve chamber
12-1 inlet port
12-2 outlet port
14 valve mechanism
16 valve seat
18 valve body
20 stem
22 support member
24 diaphragm
26 movable magnetic pole
28 proportional solenoid
30 coil
32 yoke
34 coil bobbin
36 support frame
38 space portion
40 support member
42 spring support portion
44 spring insertion portion
46 spring
48 driving part
50 control part
51 holding frame
52 O-ring
54 conical surface
56 valve opening
58 recess
60 protrusion
62 valve driving mechanism
64 power source
66 drive bridge circuit
68-1 forward driving circuit
68-2 reverse driving circuit
71, 72 Pch-FET
73, 74 Nch-FET
76 control circuit
78 pulse generation part
80 PWM generation part
82 logic circuit
84, 202 processor
86, 204 storage part
88, 206 input/output part (I/O)
90 proportional solenoid valve body
92, 104 housing
102 hot water supply device
106 hot water supply port
108 water supply port
110 fuel gas port
112 drain port
114 exhaust opening
116 hot water delivery pipe
118 water supply pipe
120 gas pipe
122 combustion chamber
124 burner
124-1, 124-2 burner part
126 igniter
127 ignition plug
128 flame rod
130 air supply fan
132 primary heat exchanger
134 secondary heat exchanger
135 coupling pipe
136 drain receiver
138 drain tank
140 drain discharge pipe
142 gas supply pipe
142-1, 142-2 gas supply pipe
144 valve unit
146 water supply pipe
148, 158, 164 temperature sensor
150 water volume sensor
152 water control valve for mixing
154 hot water outlet pipe
156 hot water supply pipe
160 water control valve
162 bypass pipe
167 valve unit housing 168 inlet port
170-1, 170-2 outlet port
172, 174, 176 electromagnetic valve
200 control system
Q fluid
G fuel gas

The invention claimed is:

1. A proportional solenoid valve control method, valve opening degree being controlled by excitation of a proportional solenoid, the proportional solenoid valve control method comprising:
generating a driving current that excites the proportional solenoid;
generating a forward pulse containing a first polarity reversal portion that reverses a reverse polarity of the driving current to a forward polarity and first pulses following the first polarity reversal portion;
generating a reverse pulse containing a second polarity reversal portion that reverses the forward polarity of the driving current to the reverse polarity and second pulses following the second polarity reversal portion;
reversing a polarity of the driving current at a cycle faster than movement of a valve body by using the forward pulse and the reverse pulse; and
controlling the valve opening degree by a current level of the driving current that depends on the first pulses and the second pulses.

2. The proportional solenoid valve control method of claim 1, further comprising:
controlling a duty ratio of the forward pulse except for the polarity reversal portion; and
controlling a duty ratio of the reverse pulse except for the polarity reversal portion.

3. A proportional solenoid valve system comprising:
a proportional solenoid valve whose valve opening degree is configured to be controlled by excitation of a proportional solenoid;
a driving part configured to generate a driving current that excites the proportional solenoid, the driving part being configured to feed the driving current to the proportional solenoid; and
a control part including a logic circuit configured to generate a forward pulse containing a first polarity reversal portion that reverses a reverse polarity of the driving current to a forward polarity and first pulses following the first polarity reversal portion, the logic circuit being configured to generate a reverse pulse containing a second polarity reversal portion that reverses the forward polarity of the driving current to the reverse polarity and second pulses following the second polarity reversal portion, the control part being configured to reverse a polarity of the driving current at a cycle faster than movement of a valve body by using the forward pulse and the reverse pulse, the control part being configured to control the valve opening degree by a current level of the driving current that depends on the first pulses and the second pulses.

4. The proportional solenoid valve system of claim 3, further comprising a pulse width control part configured to control a duty ratio of the forward pulse except for the polarity reversal portion or a duty ratio of the reverse pulse except for the polarity reversal portion.

5. A proportional solenoid valve control device comprising:
a driving part configured to generate a driving current that excites a proportional solenoid configured to control a valve opening degree by excitation, the driving part being configured to feed the driving current to the proportional solenoid; and
a control part including a logic circuit configured to generate a forward pulse containing a first polarity reversal portion that reverses a reverse polarity of the driving current to a forward polarity and first pulses following the first polarity reversal portion, the logic circuit being configured to generate a reverse pulse containing a second polarity reversal portion that reverses the forward polarity of the driving current to the reverse polarity and second pulses following the second polarity reversal portion, the control part being configured to reverse a polarity of the driving current at a cycle faster than movement of a valve body by using the forward pulse and the reverse pulse, the control part being configured to control the valve opening degree by a current level of the driving current that depends on the first pulses and the second pulses.

6. The proportional solenoid valve control device of claim 5, wherein
the control part comprises a pulse width control part configured to control a duty ratio of the forward pulse except for the polarity reversal portion or a duty ratio of the reverse pulse except for the polarity reversal portion.

7. A non-transitory computer readable medium storing a valve opening degree control program for causing a computer to implement the functions of:
generating control information for generating a driving current that excites a proportional solenoid;
generating a forward pulse containing a first polarity reversal portion that reverses a reverse polarity of the driving current to a forward polarity and first pulses following the first polarity reversal portion;
generating a reverse pulse containing a second polarity reversal portion that reverses the forward polarity of the driving current to the reverse polarity and second pulses following the second polarity reversal portion;
generating control information reversing a polarity of the driving current at a cycle faster than movement of a valve body by using the forward pulse and the reverse pulse; and
generating control information controlling a valve opening degree by a current level of the driving current that depends on the first pulses and the second pulses.

8. The non-transitory computer readable medium of claim 7, storing the valve opening degree control program for further causing the computer to implement the functions of:
controlling a duty ratio of the forward pulse except for the polarity reversal portion; and
controlling a duty ratio of the reverse pulse except for the polarity reversal portion.

9. A proportional solenoid valve comprising:
a valve mechanism configured to be controlled by excitation of a proportional solenoid;
a driving part configured to feed a driving current to the proportional solenoid; and
a control part including a logic circuit configured to generate a forward pulse containing a first polarity reversal portion that reverses a reverse polarity of the driving current to a forward polarity and first pulses following the first polarity reversal portion, the logic circuit being configured to generate a reverse pulse containing a second polarity reversal portion that reverses the forward polarity of the driving current to the reverse polarity and second pulses following the second polarity reversal portion, the control part being configured to reverse a polarity of the driving current at a cycle faster than movement of a valve body by using the forward pulse and the reverse pulse to cancel a residual magnetism, the control part being configured to adjust a valve opening degree by a current level of the driving current that depends on the first pulses and the second pulses.

10. The proportional solenoid valve of claim 9, wherein the control part comprises a pulse width control part configured to control a duty ratio of the forward pulse except for the polarity reversal portion or a duty ratio of the reverse pulse except for the polarity reversal portion.

11. A proportional solenoid valve comprising:
a valve mechanism;
a proportional solenoid configured to control the valve mechanism by excitation;
a driving part configured to generate a driving current that excites the proportional solenoid, the driving part being configured to feed the driving current to the proportional solenoid; and
a control part including a logic circuit configured to generate a forward pulse containing a first polarity reversal portion that reverses a reverse polarity of the driving current to a forward polarity and first pulses following the first polarity reversal portion, the logic circuit being configured to generate a reverse pulse containing a second polarity reversal portion that reverses the forward polarity of the driving current to the reverse polarity and second pulses following the second polarity reversal portion, the control part being configured to reverse a polarity of the driving current at a cycle faster than movement of a valve body by using the forward pulse and the reverse pulse, the control part being configured to control a valve opening degree by a current level of the driving current that depends on the first pulses and the second pulses.

12. The proportional solenoid valve of claim 11, wherein the control part further comprises a pulse width control part configured to control a duty ratio of the forward pulse except for the polarity reversal portion or a duty ratio of the reverse pulse except for the polarity reversal portion.

13. A heat source device comprising:
a burner configured to burn fuel gas;
a proportional solenoid valve whose valve opening degree is configured to be controlled by excitation of a proportional solenoid, the proportional solenoid valve being configured to allow the fuel gas that is to be supplied to the burner to pass through;
a driving part configured to generate a driving current that excites the proportional solenoid, the driving part being configured to feed the driving current to the proportional solenoid; and
a control part including a logic circuit configured to generate a forward pulse containing a first polarity reversal portion that reverses a reverse polarity of the driving current to a forward polarity and first pulses following the first polarity reversal portion, the logic circuit being configured to generate a reverse pulse containing a second polarity reversal portion that reverses the forward polarity of the driving current to the reverse polarity and second pulses following the second polarity reversal portion, the control part being configured to reverse a polarity of the driving current at a cycle faster than movement of a valve body by using the forward pulse and the reverse pulse, the control part being configured to control a valve opening degree by a current level of the driving current that depends on the first pulses and the second pulses.

14. The heat source device of claim 13, further comprising:
a heat exchanger configured to transfer combustion heat of the fuel gas to a fluid to be heated; and
a temperature sensor configured to detect a temperature of the heated fluid, wherein
the control part is configured to receive the detected temperature of the heated fluid to control the valve opening degree.

15. The heat source device of claim 13, wherein
the control part comprises a pulse width control part configured to control a duty ratio of the forward pulse except for the polarity reversal portion or a duty ratio of the reverse pulse except for the polarity reversal portion.

16. A hot water supply device comprising the heat source device of claim 13, the hot water supply device configured to heat supply water to supply hot water at a hot water supply temperature raised to a set temperature.

17. A heat source device control method using a proportional solenoid valve to control fuel gas, the heat source device control method comprising:
generating a driving current that drives the proportional solenoid valve;
burning the fuel gas having passed through the proportional solenoid valve;
generating a forward pulse containing a first polarity reversal portion that reverses a reverse polarity of the driving current to a forward polarity and first pulses following the first polarity reversal portion;
generating a reverse pulse containing a second polarity reversal portion that reverses the forward polarity of the driving current to the reverse polarity and second pulses following the second polarity reversal portion;
reversing a polarity of the driving current at a cycle faster than movement of a valve body by using the forward pulse and the reverse pulse; and
controlling a valve opening degree by a current level of the driving current that depends on the first pulses and the second pulses.

18. The heat source device control method of claim 17, further comprising:
transferring combustion heat of the fuel gas to a fluid to be heated; and
detecting a temperature of the heated fluid and controlling the valve opening degree by the detected temperature of the heated fluid.

19. The heat source device control method of claim 17, further comprising:
controlling a duty ratio of the forward pulse except for the polarity reversal portion; and
controlling a duty ratio of the reverse pulse except for the polarity reversal portion.

20. A non-transitory computer readable medium storing a heat source device control program for causing a computer to implement the functions of:
generating control information for generating a driving current that excites a proportional solenoid;
generating a forward pulse containing a first polarity reversal portion that reverses a reverse polarity of the driving current to a forward polarity and first pulses following the first polarity reversal portion;

generating a reverse pulse containing a second polarity reversal portion that reverses the forward polarity of the driving current to the reverse polarity and second pulses following the second polarity reversal portion;

generating control information reversing a polarity of the driving current at a cycle faster than movement of a valve body by using the forward pulse and the reverse pulse; and generating control information controlling a valve opening degree by a current level of the driving current that depends on the first pulses and the second pulses.

21. The non-transitory computer readable medium of claim 20, storing the heat source device control program for further causing the computer to implement the functions of:

controlling a duty ratio of the forward pulse except for the polarity reversal portion; and controlling a duty ratio of the reverse pulse except for the polarity reversal portion.

22. A control device configured to control a fuel gas volume, the control device comprising:

a driving part configured to generate a driving current that excites a proportional solenoid configured to control a valve opening degree by excitation, the driving part being configured to feed the driving current to the proportional solenoid; and a control part including a logic circuit configured to generate a forward pulse containing a first polarity reversal portion that reverses a reverse polarity of the driving current to a forward polarity and first pulses following the first polarity reversal portion, the logic circuit being configured to generate a reverse pulse containing a second polarity reversal portion that reverses the forward polarity of the driving current to the reverse polarity and second pulses following the second polarity reversal portion, the control part being configured to reverse a polarity of the driving current at a cycle faster than movement of a valve body by using the forward pulse and the reverse pulse, the control part being configured to control the valve opening degree by a current level of the driving current that depends on the first pulses and the second pulses.

23. The control device of claim 22, wherein the control part comprises a pulse width control part configured to control a duty ratio of the forward pulse except for the polarity reversal portion or a duty ratio of the reverse pulse except for the polarity reversal portion.

* * * * *